(12) United States Patent
Kohara et al.

(10) Patent No.: US 7,661,864 B2
(45) Date of Patent: Feb. 16, 2010

(54) BACK-LIGHT UNIT HAVING PRISM SHEET INCLUDING REFLECTIVE ELEMENTS WITH DIFFERENT CURVATURE SURFACES, A BACK-LIGHT UNIT AND LCD DEVICE USING SAID BACK-LIGHT UNIT

(75) Inventors: Sayuri Kohara, Sagamihara (JP); Daiju Nakano, Sagamihara (JP); Fumiaki Yamada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/117,195

(22) Filed: May 8, 2008

(65) Prior Publication Data
US 2008/0212338 A1 Sep. 4, 2008

(51) Int. Cl.
*F21V 7/09* (2006.01)

(52) U.S. Cl. ............... 362/606; 362/311.06; 362/339; 362/246; 349/64

(58) Field of Classification Search ........... 362/606, 362/246, 311, 339; 349/64
See application file for complete search history.

(56) References Cited

U.S. PATENT DOCUMENTS

| 1,208,456 | A | * | 12/1916 | Bell | 362/339 |
|---|---|---|---|---|---|
| 6,129,439 | A | * | 10/2000 | Hou et al. | 362/626 |
| 6,280,063 | B1 | * | 8/2001 | Fong et al. | 362/339 |
| 6,752,505 | B2 | * | 6/2004 | Parker et al. | 362/627 |
| 7,278,774 | B2 | * | 10/2007 | Chang | 362/626 |
| 2003/0058633 | A1 | * | 3/2003 | Suzuki | 362/31 |

FOREIGN PATENT DOCUMENTS

| JP | PUPA07-294709 | 11/1995 |
|---|---|---|
| JP | PUPA08-254606 | 10/1996 |
| JP | PUPA10-261309 | 9/1998 |
| JP | PUPA11-38209 | 2/1999 |
| JP | PUPA2000-147495 | 5/2000 |
| JP | PUPA2000-294019 | 10/2000 |

* cited by examiner

*Primary Examiner*—Ismael Negron
(74) *Attorney, Agent, or Firm*—Michael J. Buchenhorner; Vazken Alexanian

(57) ABSTRACT

A prism sheet changes a direction of light propagation by reflecting light launched with an intensity distribution of a predetermined angle range wherein: a reflective surface for perfect reflection of light includes a higher order surface constructed by at least a small curvature surface and a surface different from the small curvature surface.

12 Claims, 18 Drawing Sheets

(a)

(b)

(c)

BACK-LIGHT UNIT HAVING PRISM SHEET INCLUDING REFLECTIVE ELEMENTS WITH DIFFERENT CURVATURE SURFACES, A BACK-LIGHT UNIT AND LCD DEVICE USING SAID BACK-LIGHT UNIT

TECHNICAL FIELD

The present invention relates to a prism sheet having prism structures. More specifically, the present invention relates to a prism sheet having prism structures for selectively reflecting light in a display device, a back-light unit comprising said prism sheet, and a transmission type liquid crystal display device.

PRIOR ART

A liquid crystal display device, particularly a transmission type liquid crystal display device is applied to a portable notebook personal computer, a television set and the like. In recent years, demands for a lower power consumption, a longer battery life, a lighter weight, a higher contrast, and a compactness have been increased. The transmission type liquid crystal display device normally comprises a back-light unit using a light source such as a small fluorescent tube to irradiate light from the rear side. It is said that this transmission type crystal display device is capable of displaying various types of images according to changes in a light transmittance state of a liquid crystal panel driven by a driving means such as a thin-film transistor array. In this case, when only power consumption of a light source such as a small fluorescent tube is suppressed to specifically suppress power consumption and extend a battery life, a luminance of a display is lowered resulting in a darkened display which is hard to be seen, and a contrast is also deteriorated. Consequently, it is difficult to provide excellent display characteristics.

Accordingly, a back-light unit which is capable of suppressing power consumption together with improving a luminance has been demanded. In recent years, a back-light unit having a directional launching property is used commonly as a back-light unit of a liquid crystal display device. The reason why is because a back-light having directionality causes a fewer loss by reflection than a conventional back-light of a scattering type, and this back-light unit is capable of effectively using light from a small fluorescent tube to suppress power consumption while providing an excellent display characteristic.

Further, back-light units employing various systems, for example, a direct-under type and a side-light type, have been proposed as back-light units for the liquid crystal display device. In recent years, the side-light type has become a mainstream along with increasing reduction of a thickness and a weight of a transmission type liquid crystal display device.

FIG. 26 shows a conventional back-light unit of a side-light type. As shown in FIG. 26, the conventional back-light unit comprises a light source 60 such as a small fluorescent tube, a light source section 62 comprising a lamp holder having a reflector, a planer light guide 64 which guides light from the light source 60 to inside of the surface, and a passive reflector 66 disposed under the planer light guide 64. Further, as shown in FIG. 26, optical components such as a prism sheet 68 for light condensing and diffusing plate 70 for resolving uneven brightness are disposed above the planer light guide 64.

Light irradiated from the light source 60 is condensed in the light source section 62 and thereafter launched onto the planer light guide 64. The planer light guide 64, formed of a transparent acrylic resin or the like, constitutes a planer light source which reflects and guides the incident light along the inside of the planer light guide 64 and provides almost even brightness allover the planer light guide. There are two major methods for extracting light from the planer light guide, and an exit distribution depends on a method of extracting light.

One method of extracting light from the planer light guide 64 is the one used commonly for a liquid crystal television set or a liquid crystal monitoring device. This method extracts light L to the front side in a normal direction of the planer light guide 64 by scattering the light L with a dot pattern printed on the bottom of the planer light guide. The light L extracted by this method from the planer light guide 64 has a relatively isotropic distribution.

Another method for extracting light from the planer light guide 64 is the one commonly used for a portable notebook personal computer, a television set, a cellular phone and the like. This method extracts light out of the planer light guide by constructing the planer light guide 64 into a wedge shape to break perfect reflection conditions of light. In this case, a dot pattern is also printed or processed on the bottom of the planer light guide to resolve deflection or uneven brightness. When the method is employed to extract light, exit light has a directional distribution at an intensity peak in an oblique direction which inclines greatly from a normal direction of the planer light guide 64 to the direction of propagation of the light. In either of the extracting methods, light leaking from the bottom of the planer light guide 64 is deflected to a normal direction by the passive reflector 62 disposed on the rear side of the planer light guide.

Further, as shown in FIG. 26, one diffusing plate is or two diffusing plates are often disposed on the planer light guide to reduce unevenness of brightness of a light source. Still further, the required number of prism sheets are appropriately disposed in addition to the diffusing plate (diffusing plates) to improve the front brightness by deflecting and condensing light from the planer light guide 64 and the diffusing plate 70.

The prism sheets have hitherto been studied to improve various features of the transmission type liquid crystal display device. For example, exit light from the surface of the planer light guide of the back-light unit of the side-light type having the directional launching property normally shows an exit light distribution at an intensity peak in an oblique direction on the opposite side of a launching direction of the light source from a normal direction as aforementioned. Optical sheets such as prism sheets or lens sheets are normally used to deflect the light from the planer light guide. Various studies have also hitherto been made about shapes of prisms and structure of lenses on the optical sheets. For example, an upward type prism sheet shown in FIG. 26 having prisms on the upper surface thereof and a downward type prism sheet disclosed in Japanese Patent Laid-Open Publication No. 2000-89009 having prisms on the bottom surface thereof have been proposed.

The prism sheet having prisms facing up, i.e., the liquid crystal panel side, hereinafter refers to the upward type prism sheet. The prism sheet having prisms facing down, i.e., the planer light guide side hereinafter refers to the downward type prism sheet. The upward type prism sheet and the downward type prism sheet have different principles of light deflection and different structures.

Prisms on the upward type prism sheet of the commonest shape have cross-sectional shapes of right-angled equilateral triangles. Two of such prism sheets are combined and disposed on the planer light guide, one of the prism sheets is disposed so that triangular prisms are parallel to the light source (to condense exit light to the parallel direction to the fluorescent tube), and the other prism sheet is disposed so that triangular prisms are vertical to the small fluorescent tube (to condense light in the direction thereof). The diffusing plate is normally disposed between or under the prism sheets to eliminate unevenness of brightness.

However, although the upward type prism sheet is appropriate for deflecting light with a low directionality of a liquid crystal panel or a television set, it cannot be said that the upward type prism sheet is appropriate for deflecting light from a back-light unit using a wedge-shaped planer light guide having a high directionality to a normal direction. Further, prism sheets having prisms of pentagonal cross-sectional shapes have hitherto been disclosed as upward type prism sheets in Japanese Patent Laid-Open Publication Heisei Nos. 7-230002 and 8-254606, and upward type prism sheets having prisms with curved side surfaces have hitherto been disclosed as upward type prism sheets in Japanese Patent Laid-Open Publication Heisei No. 7-2947606 and No. 2000-347011. The objective of both the prism sheets is to improve brightness in a normal direction by employing the principle of refraction to deflect light.

On the other hand, downward type prism sheets configured to improve brightness of back-light units having directional launching properties are disclosed in Japanese Patent Laid-Open Publication Heisei No. 11-84111 and No. 2000-89009.

Such downward type prism sheet disclosed in Japanese Patent Laid-Open Publication Heisei No. 11-84111 or No. 2000-89009 has hitherto been used so that tops of prisms are disposed adjacently to each other on the planer light guide. Further, a diffusing plate might be disposed between the prism sheet and the planer light guide. Downward type prism sheets having various shapes have been proposed. However, the prism sheet with prisms having cross-sectional shapes of equilateral triangles formed thereon is used most generally. Still further, it is said that a downward type prism sheet having a structure specifically effective to improve brightness is an asymmetric prism sheet with prisms formed horizontally asymmetric thereon. However, various problems have been pointed out with regard to these known downward type prism sheets.

FIG. 27 is a schematic illustration of the commonest prism sheet with prisms having cross-sectional shapes of equilateral triangles formed thereon. It is an object of the prism sheet shown in FIG. 27 to improve the front brightness by deflecting light launched from the planer light guide to the upper surface of prisms. In the downward type prism sheet shown in FIG. 27, light L from the planer light guide or the diffusing plate is launched from the first side surface f of the prisms and then light L is reflected on the second side surface s and deflected to a normal direction. At this time, the peak angles of prisms are designed so that the brightness in a normal direction becomes the highest against light launched at an angle of an intensity peak of light launched with an intensity distribution within a predetermined angle range. However, since the second surface s is a planer surface, light other than the light launched at an angle of an intensity peak is not deflected effectively to a normal direction, the brightness is not improved sufficiently by light condensing.

Further, FIG. 28 shows an asymmetric prism sheet disclosed in Japanese Patent Laid-Open Publication Heisei No. 10-254371 which was proposed for the purpose of improving brightness. The cross section of a prism portion of the asymmetric prism sheet shows an inequilateral triangle, angles thereof from a normal direction of the sheet surface on the first surface f and the second surface s being different. Sides f and s of the prism are formed obliquely so that exit light at a predetermined angle from the planer light guide is deflected to the approximate direction of the normal line by reflection on the second surfaces of the prism. In addition, the prism is designed so that light can be reflected twice inside the second surface s and the first surface f, respectively, and secondary light is deflected to the front side. Accordingly, the downward type prism sheet disclosed in Japanese Patent Laid-Open Publication Heisei No. 10-254371 generates secondary light in addition to main light to a normal direction and also contributes to reflection from the generated secondary light. Therefore, this downward type prism sheet has an effect of improving brightness.

However, the asymmetric prism sheet disclosed in Japanese Patent Laid-Open Publication Heisei No. 10-254371 has the following disadvantages: (1) since the cross-sectional shape of the side is a simple straight line, light deflected to a normal direction is light having only two angles and exit light to a direction other than these angles is not deflected, (2) a peak angle of light from a planer light guide of a back-light having directional launching property ranges from 60 to 80 degrees, when prisms are designed asynchronously facing down so that light having such angle distribution is deflected to a normal direction however, a vertical angle of a prism becomes no more than 50 degrees and this sharp top causes an inferior productivity resulting in bad yield rate inappropriate for mass production.

As described above, while there is a tendency showing that back-light units having a high directionality are beginning to be used in recent years, the upward prism sheet which has hitherto been used most generally is disadvantageously inappropriate for deflecting and condensing light having directionality by a reflection loss.

Further, regarding the downward type prism sheet, higher efficiency of light reflection and condensing, easier manufacturing, and higher light directionality have been expected.

In addition, a back-light unit capable of suppressing power consumption of the small fluorescent tube and providing high brightness and high contrast display under the conditions of compactness and lightweight has been required.

Further, a compact and lightweight transmission type liquid crystal display device capable of extending a battery driving time has been required.

PROBLEMS TO BE SOLVED BY THE INVENTION

The present invention was made in consideration of the conventional disadvantages, and the objective thereof is to provide a prism sheet having a high reflection efficiency, easy manufacturability and a function of improving directionality of light.

Further, it is an object of the present invention to provide a back-light unit and a transmission type liquid crystal display device capable of enabling high brightness, high contrast, low power consumption, long battery driving time and compactness.

MEANS TO SOLVE PROBLEMS

Figure 1:
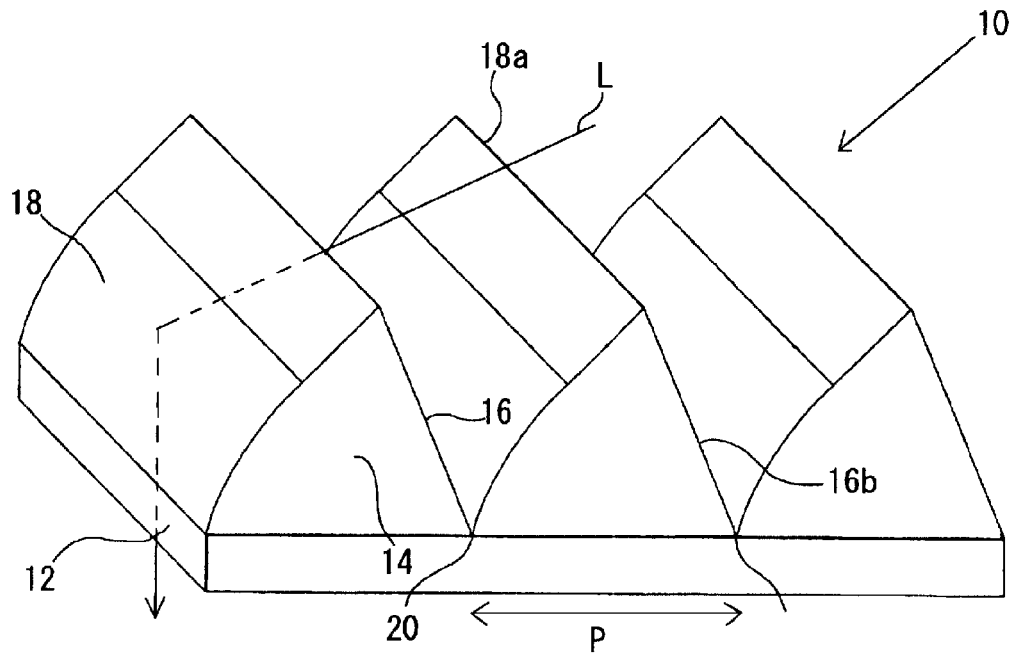
FIG. 1 is a perspective view showing a portion of the prism sheet according to the present invention.

The present invention was made by adopting a downward prism structure while providing high light reflection and deflection efficiencies to a prism sheet by adopting a prism sheet employing perfect reflection from a higher order surface and further finding out that the prism sheet may be manufactured easily at a low cost.

That is to say, according to the present invention, a prism sheet for changing a direction of propagation of light propagation by reflecting light launched with an intensity distribution of a predetermined angle range, said prism sheet comprising:

a reflective surface extending from a sheet base to a top for providing perfect reflection, the reflective surface comprising a higher order surface constructed by at least a small curvature surface and a surface different from the small curvature surface.

In the prism sheet according to the present invention, the higher order surface comprises a plurality of continuous planer surfaces.

Further, in the prism sheet according to the present invention, the higher order surface comprises at least a planer surface as the small curvature surface and a curved surface continuous thereto. The prism sheet according to the present invention comprises a plurality of the reflective surfaces formed in close proximity, and each closely disposed reflective surface being connected through a connection plane extending from said sheet base to said top of an adjacent reflective surface. In the prism sheet according to the present invention, the small curvature surface extends to a predetermined position from the top of the reflective surface along with a direction toward the sheet base. The connection plane according to the present invention transmits light launched with the intensity distribution of the predetermined angle range to the reflective surface. The prism sheet according to the present invention preferably has a transmittance of no less than 90%, and an angle distribution of exit light is preferably no more than 15 degrees at a full width at half maximum.

Further, the present invention provides a back-light unit comprising:

a light source for providing light exposed to the liquid crystal panel, a planer light guide for changing a direction of propagation of the light to the liquid crystal panel, and a prism sheet disposed adjacently to said planer light guide;

wherein the prism sheet comprises a reflective surface for providing perfect reflection of light launched with an intensity distribution of a predetermined angle range from the planer light guide; and the reflective surface comprising a higher order surface constructed by at least a small curvature surface and a surface different from said small curvature surface.

The higher order surface of the back-light unit according to the present invention comprises a plurality of continuous planes. The higher order surface of the back-light unit according to the present invention comprises at least a planer surface as the small curvature surface and a curved surface continuous thereto. The prism sheet according to the present invention comprises a plurality of the reflective surfaces formed in close proximity, and each closely disposed reflective surface being connected through a connection plane extending from the sheet base to the top of an adjacent reflective surface. The small curvature surface preferably extends to a predetermined position from the top of the reflective surface along with a direction toward the sheet base. The connection plane according to the present invention transmits light launched with the intensity distribution of the predetermined angle range to the reflective surface. The top of the reflective surface constituting the prism sheet according to the present invention is disposed adjacently to the planer light guide.

Further, the present invention provides a transmission type liquid crystal display device comprising a back-light unit and a liquid crystal panel, the back-light unit comprising:

a light source for providing light exposed to said liquid crystal panel, a planer light guide for changing a direction of propagation of the light to the liquid crystal panel, and a prism sheet disposed adjacently to the planer light guide;

wherein the prism sheet comprises a reflective surface extending from a sheet base to a top for providing perfect reflection and the reflective surface comprises a higher order surface constructed by at least a small curvature surface and a surface different from the small curvature surface.

The higher order surface of the transmission type liquid crystal display device according to the present invention comprises a plurality of continuous planer surfaces. The higher order surface according to the present invention comprises at least a planer surface as the small curvature surface and a curved surface continuous thereto. The prism sheet according to the present invention comprises a plurality of said reflective surfaces formed in close proximity, and said each closely disposed reflective surface being connected through a connection plane extending from said sheet base to said top of an adjacent reflective surface. The small curvature surface according to the present invention transmits said light launched with the intensity distribution of the predetermined angle range to the reflective surface. The top of the reflective surface constituting the prism sheet is disposed adjacently to the planer light guide. Further, according to the present invention, a lens element may be disposed between the back-light unit and the liquid crystal panel.

BEST MODE FOR CARRYING OUT THE INVENTION

The present invention will be described with reference to but not limited to specific embodiments shown in the drawings.

Section 1: Structure of Prism Sheet

FIG. 1 is a perspective view of a part of a prism sheet 10 according to the present invention. The prism sheet 10 according to the present invention comprises a sheet base 12 and a prism structure 14 formed uniformly with the sheet base 12. The prism structure 14 extends allover the surface of the prism sheet 10 together with being disposed continuously at predetermined pitches p.

In order to prevent the pitches p (i.e., sizes of prisms) between prism structures for the liquid crystal display device from being conspicuous when a screen is seen while preventing interference with a repetitive pattern with regularity such as pixels, sizes of the pitches p are preferably made exactly the same as pitches between pixels and the pitches p are preferably disposed with positions thereof adjusted to those of pixels or prisms are preferably created at sufficiently fine pitches in comparison to those of pixels. However, since there is actually a technical difficulty in adjusting positions of pixels to those of prisms minutely, prism structures are often created at finer pitches p than pitches between pixels.

However, since fineness of the liquid crystal display device has been improved in recent years, when the pitches p are made too fine, an interference color may be generated depending on coherency (coherent length) of a light source. In general, a pitch p is often set to about 10 μm, specifically, in the range of 30 μm to 0.5 μm. In a specific embodiment of the present invention, a pitch p of the prism structure may be set to 50 μm to 60 μm. Further, a fluctuation may be given to the pitches p of the prism structures according to the present invention to prevent interference.

As shown in FIG. 1, the prism structure is formed by the sheet base 12, a connection plane 16 and a higher order surface 18 constituting a near triangular prism. The connection plane 16 connects the sheet base 12 and a top 18a of the higher order surface 18. The higher order surface 18 extends from the top 18a to an end portion 20 of an adjacent connection plane 16b toward the sheet base 12. Light L is launched with an intensity distribution of a predetermined angle range to the connection plane 16. The launched light L propagates to the higher order surface 18 and thereafter the higher order surface 18 reflects the light L to the sheet base 12 side.

Figure 2:
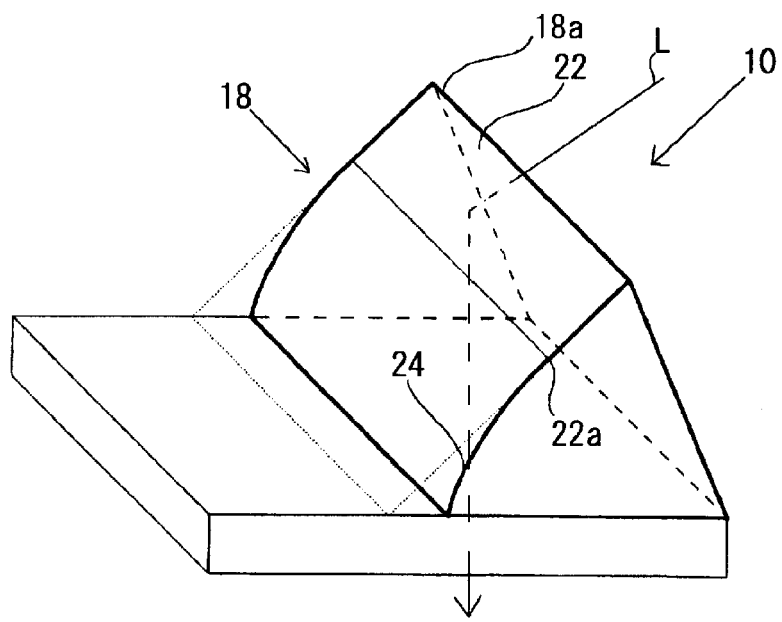
FIG. 2 is a view showing the prism structure formed onto the prism sheet according to the present invention in details.

FIG. 2 shows only one of continuous prism structures to show a prism structure formed on the prism sheet 10 according to the present invention in further details. As shown in FIG. 2, the prism sheet 10 according to the present invention is formed of a light transparent material and the constitution thereof allows launched light L to be reflected on the inner side of the higher order surface 18 of the prism structure. The higher order surface 18 extends from the top 18a for a predetermined length. The higher order surface 18 according to the present invention comprises a planer surface 22 as a small curvature surface and a curved surface 24 continuous to and starting from an end portion 22a of the planer surface 22. The launched light L is reflected by the planer surface 22 or the curved surface 24 to the sheet base 12, transmits the sheet base 12 and irradiated onto a diffusion sheet or a liquid crystal panel (not shown). The planer surface 22 may be enumerated as the above-described small curvature surface used for the present invention in a specific embodiment. However, the small curvature surface according to the present invention is not limited to the planer surface 22 and any geometrical surface, any aspherical surface or any compound surface as long as the surface has a smaller curvature than that of the curved surface 24 continuous to the planer surface 22 and a curvature capable of reflecting light with a predetermined intensity peak launched at an angle as small as no more than 15 degrees efficiently. In the present invention, since a planer surface may be used as a preferable embodiment of the above-described small curvature surface from viewpoints of manufacturing and designing, the present invention will be described on premise of using the planer surface 22 as a small curvature surface for convenience of explanation.

Figure 3:
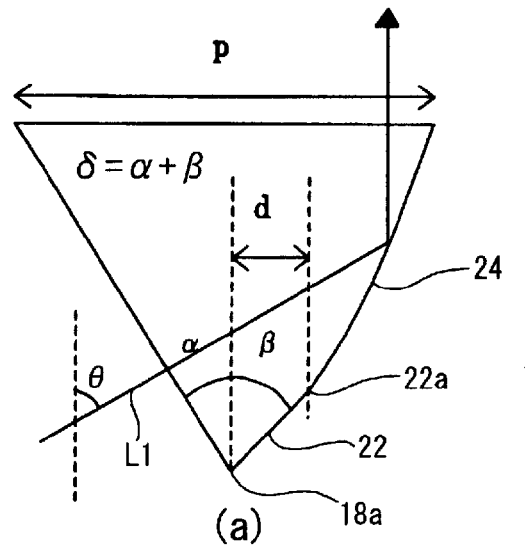
FIG. 3 is across-sectional view along with the pitch direction of the prism structure shown in FIGS. 1 and 2.
Figure 3:
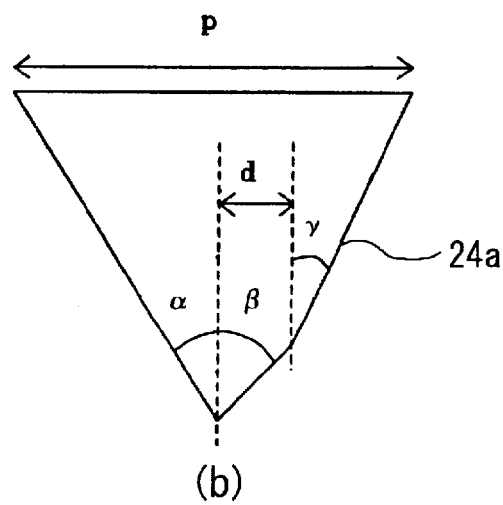
Figure 3:
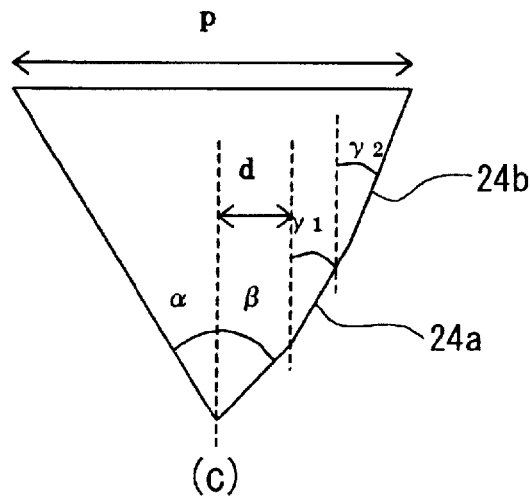

FIG. 3 is a cross-sectional view along with a direction of the pitch of the prism structure shown in FIG. 2. FIG. 3(a) shows a first embodiment of the higher order surface 18 included in the prism structure used in the present invention. FIG. 3(b) shows a second embodiment of the higher order surface 18 included in the prism structure. FIG. 3(c) shows a third embodiment of the higher order surface 18 included in the prism structure. FIG. 3(a) shows the most preferable embodiment wherein the higher order surface comprises the planer surface 22 and the curved surface 24 connected thereto. FIGS. 3(b) and 3(c) show higher order surfaces formed approximately of minute planes from the viewpoint of manufacturing.

As shown in FIG. 3(a), the higher order surface 18 included in the prism structure used in the present invention comprises the planer surface 22 extending from the top 18a for a predetermined length and the curved surface 24 continuous thereto. The position along with the direction of pitches from the top 18a to the end portion 22a of the planer surface 22 extends to the critical position. The prism structure immediately before this critical position prevents light at an intensity peak within an angle distribution of launched light from reaching the critical position. Further, the planer surface 22 is formed in an angle allowing reflection of the light at the intensity peak within the angle distribution of the launched light to the normal direction most efficiently. As shown in FIG. 3(a), light L1 launched at a greater angle than that of the light at the intensity peak is launched to the sheet base 12 side rather than to the end portion 22a and then reflected on the curved surface 24. Symbol d shown in FIG. 3(a) represents a distance from an x coordinate of the top of the prism structure to an x coordinate of the end portion 22a.

Upon assumption of a case wherein the planer surface 22 is extended to the sheet base 12 side, since the planer surface 22 is optimized to reflect light launched at an intensity peak angle vertically to the sheet base 12 side, the planer surface 22 cannot reflect light launched to the sheet base 12 side vertically to the sheet base 12 side any better than the end portion 22a. Accordingly, in the most preferable embodiment of the present invention, an upper portion of the end portion 22a is formed as the curved surface 24 wherein a reflection angle thereof against launched light is more increased continuously on the sheet base 12 than on the end portion 22a.

Further, in another embodiment of the present invention, the curved surface 24 may be formed so that a curvature changes continuously as shown in FIG. 3(a). The curved surface 24 may also be formed of an arc approximating to the curved surface 24 or a plurality of planer surfaces from the viewpoints of manufacturability and cost. FIG. 3(b) is a view showing the second embodiment wherein the higher surface 18 is formed of a plurality of planer surfaces. In the embodiment shown in FIG. 3(b), the planer surface 22 is also constituted in the same manner as that described in FIG. 3(a). Further, in the embodiment shown in FIG. 3(b), the curved surface 24 continuous to the planer surface 22 is replaced by a plurality of minute planer surfaces 24a having shorter lengths constituted to have an angle of $\beta > \gamma$ according to an angle of launched light L1.

When the curved surface 24 is approximated with minute planer surfaces in the present invention, any number of minute planer surfaces may be used to approximate the curved surface 24. However, the number of minute planer surfaces is preferably large as possible for good approximation of the curved surface 24. FIG. 3(c) is a view showing an embodiment wherein the above-described curved surface 24 is approximated with two minute planer surfaces 24a and 24b. In this case, the minute planer surfaces are also constituted so that each planer surface may have an angle of $\beta > \gamma 1 > \beta > \gamma 2$. In general when the curved surface 24 is further approximated with m minute planer surfaces in the present invention, each angle may be determined to satisfy the relationship of $\beta > \gamma 1 > \beta > \gamma 2 > \ldots \gamma_{m-1} > \gamma_m$.

Further, in the prism structure shown in FIG. 3, α may be 0 to 50 degrees, more preferably 25 to 40 degrees and the vertical angle δ of the prism may be 39 to 90 degrees, preferably 50 to 80 degrees, more preferably 62 to 77 degrees.

Figure 4:
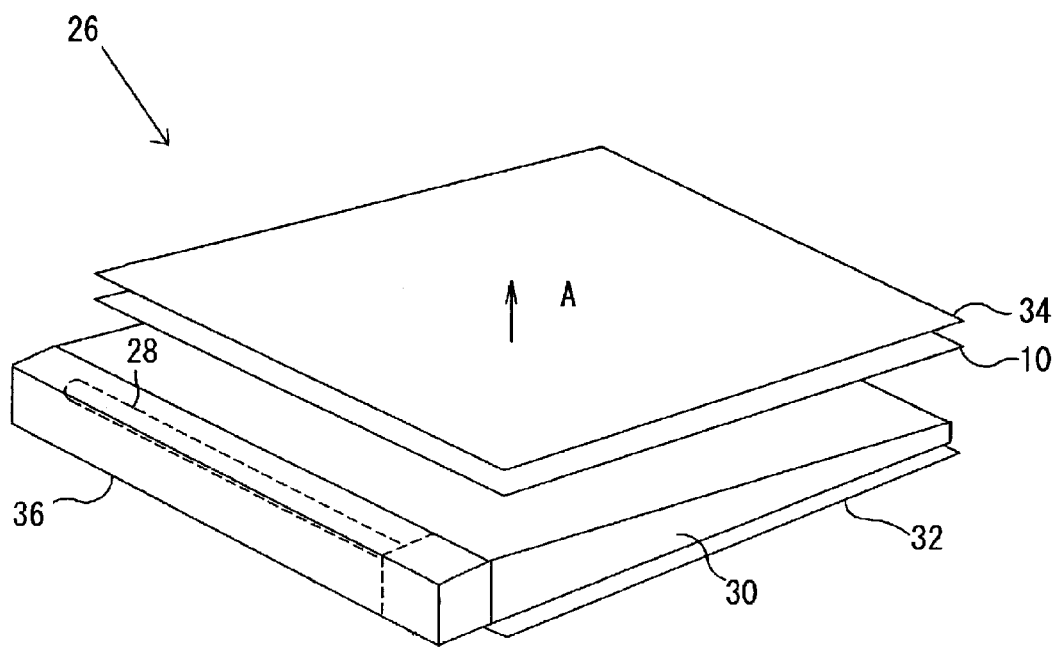
FIG. 4 is a perspective view showing the back-light unit according to the present invention using the prism sheets shown in FIGS. 1 to 3.

Section 2: Back-Light Unit and Transmission Type Liquid Crystal Display Device of Present Invention FIG. 4 is a perspective view of a back-light unit 26 according to the present invention using the prism sheet 10 shown in FIGS. 1 to 3. The back-light unit 26 shown in FIG. 4 comprises a planer light guide 30 for guiding light from a light source 28 to irradiate the light onto a liquid crystal panel (not shown), a reflective sheet 32 for reflecting light to the liquid crystal panel with a high efficiency, the prism sheet 10 according to the present invention disposed adjacently to the planer light guide 30 and a diffusing plate 34 disposed adjacently to the prism sheet 10 on the liquid crystal panel side.

The diffusing plate 34 is not necessarily disposed on the position shown in FIG. 4 and may be used appropriately with another constitution in consideration of an optical characteristic. Further, the light source 28 of the back-light unit 26 shown in FIG. 4 comprises a fluorescent tube such as a small fluorescent tube and constitutes the back-light unit 26 uniformly by being accommodated into the accommodation portion 36 constituting a reflector. In addition, any small light source other than the small fluorescent tube may be used as long as the light source is capable of providing an appropriate spectrum characteristic. Light from the light source is launched from the planer light guide 30 and thereafter deflected to the normal direction of the planer light guide 30, i.e., the direction represented by an arrow A in FIG. 4 and then irradiated onto the liquid crystal panel.

Figure 5:
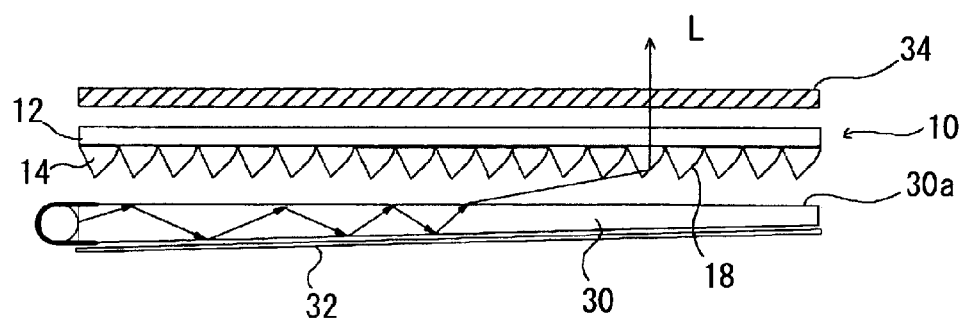
FIG. 5 is a schematic cross-sectional view showing the back-light unit according to the present invention shown in FIG. 4.

FIG. 5 is a schematic cross-sectional view of the back-light unit according to the present invention shown in FIG. 4. The cross-sectional view shown in FIG. 5 specifically shows a relationship between the prism sheet 10 and light irradiated from the planer light guide 30. As shown in FIG. 5, light led into the planer light guide 30 is given an angular directionality while being reflected in the inside of the planer light guide 30 and then irradiated onto the prism sheet 10. In the back-light unit 26 of this application, the prism sheet 10 raises the directionality of the launched light to realize high brightness to the normal direction of the planer light guide 30.

In the present invention, an angle of light launched to the prism sheet 10 refers to an angle measured counterclockwise from an upper surface 30a of the planer light guide 30. As shown in FIG. 5, light launched from the planer light guide 30 to the prism sheet 10 is reflected by the higher order surface 18 of prism structures formed on the prism sheet 10, transmitted through the diffusing plate 34 and directed to the liquid crystal panel (not shown). FIG. 5 enumerates specific light having an angle corresponding to an intensity peak of exit light from the planer light guide 30 as light launched from the planer light guide 30 to the prism sheet 10. FIG. 5 shows that light L is reflected on the end portion 22a of the higher order surface 18 and then the direction thereof is changed to the direction toward the liquid crystal panel.

Further, as shown in FIGS. 1 to 3, a base 12 side of the higher order surface 18 is formed of curved surfaces in a preferred embodiment of the present invention. By thus adopting the higher order surface 18 to the present invention, light from the planer light guide 30 may be reflected so that even light launched beyond the end portion 22a at a larger angle than that of the light shown in FIG. 5 to the sheet base 12 side and reflected thereon is directed to the normal direction of the planer light guide 30 efficiently against the liquid crystal panel.

Figure 6:
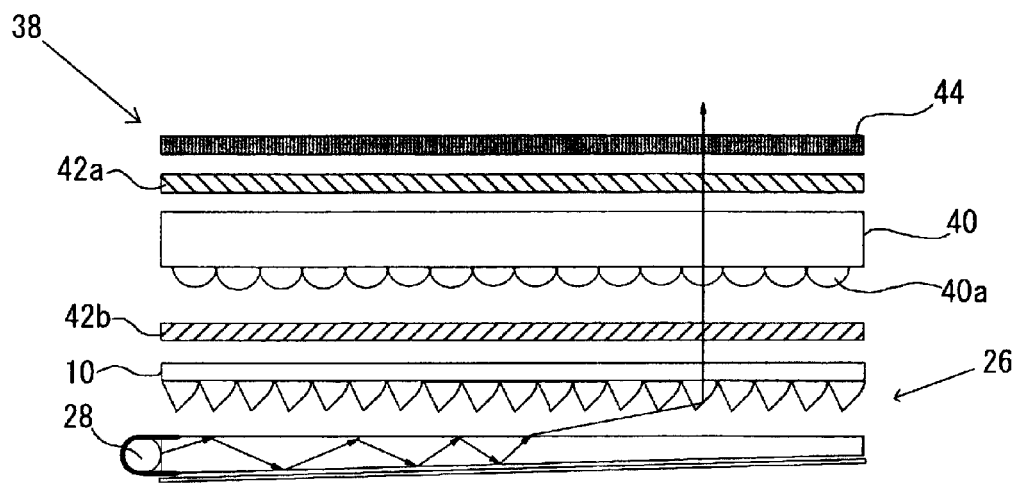
FIG. 6 is a cross-sectional view showing the transmission type liquid crystal display device comprising the back-light unit shown in FIGS. 4 and 5.

FIG. 6 is a schematic cross-sectional view showing a transmission type liquid crystal display device comprising the back-light unit 26 shown in FIGS. 4 and 5. The transmission type liquid crystal display device 38 according to the present invention comprises the back-light unit 26, a liquid crystal panel 40 disposed adjacently to the back-light unit 26, a lens element 40a for condensing or enlarging light irradiated onto the liquid crystal panel 40, a pair of polarizing plates 42a and 42b disposed adjacently to both sides of the liquid crystal panel and diffusing plate 44 for diffusing light transmitted through the liquid crystal panel 40. The lens element 40a shown in FIG. 4 may be formed into a convex lens or lenticular lens on a lens sheet or the like in the present invention. In addition, in the embodiment shown in FIG. 6 is the same as the embodiment shown in FIG. 5 except that the diffusing plates have different configurations.

FIG. 6 shows the lens element 40*a* used for the transmission type liquid crystal display device 38 according to the present invention formed into a convex lens for each pixel between the liquid crystal panel 40 and the back-light unit 26. Further, according to the present invention, lenticular lenses may be disposed on opposite positions. By using the above-described lens elements 40*a* together for the transmission type liquid crystal display device 38 according to the present invention shown in FIG. 6, the effective opening rate of the transmission type liquid crystal display device 38 may be improved. Further, use of the above-described lens elements 40*a* is not essentially required for the present invention and the conventional transmission type liquid crystal display device without using lens elements 40*a* is capable of equally enabling high brightness, longer battery driving time and high contrast.

Since the transmission type liquid crystal display device 38 according to the present invention shown in FIG. 6 comprises the back-light unit 26 comprising the prism sheet 10 according to the present invention, light given by the light source 28 is irradiated onto the liquid crystal panel 40 with a high efficiency and a high directionality. Accordingly, the transmission type liquid crystal display device 38 according to the present invention is capable of providing high brightness even when a light source of a low power consumption type is used and of a liquid crystal display with high contrast.

Figure 7:
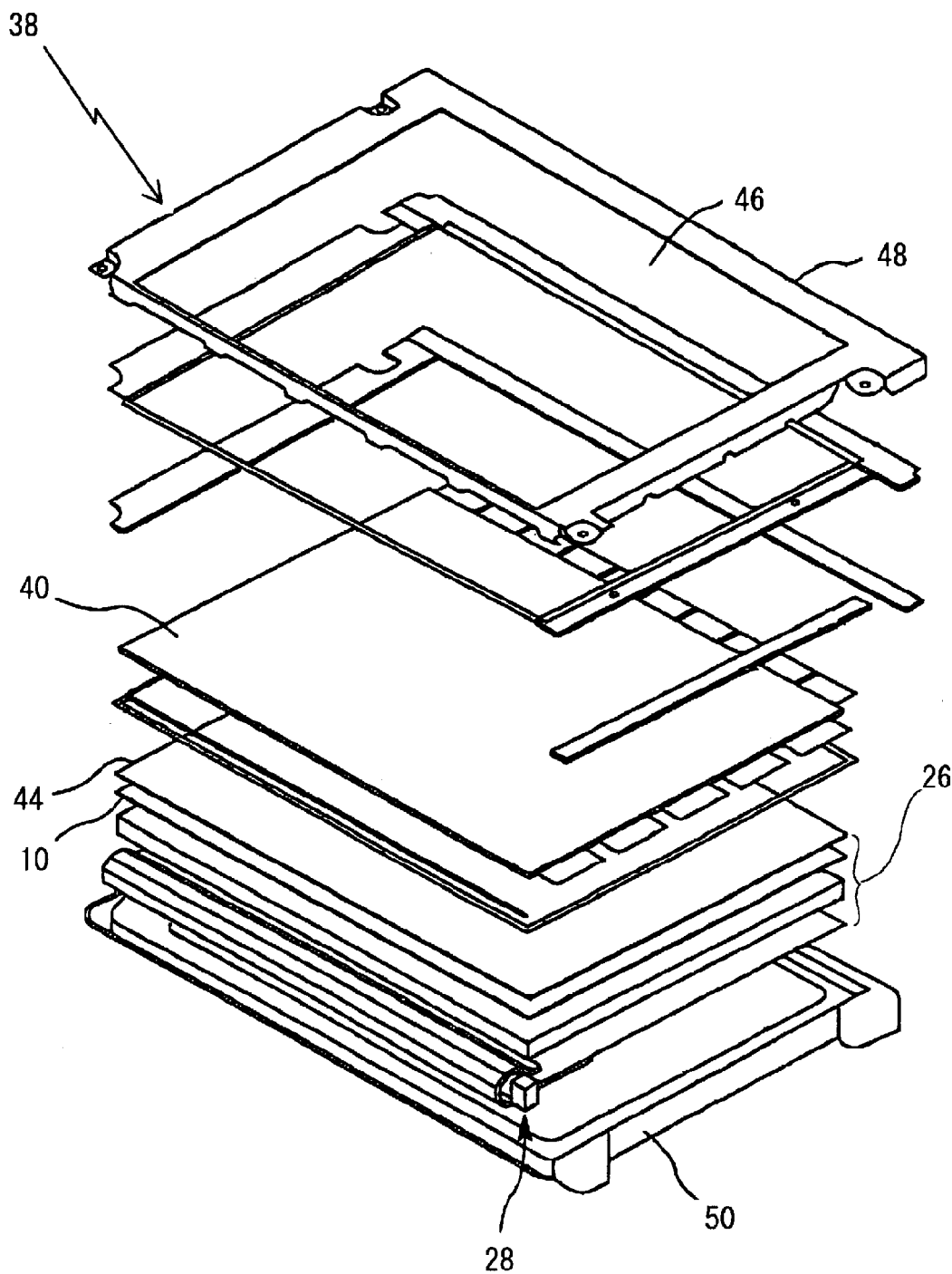
FIG. 7 is an exploded perspective view showing the transmission type liquid crystal display device according to the present invention in details.

FIG. 7 is an exploded perspective view showing the detailed structure of the transmission type liquid crystal display device 38 according to the present invention. The transmission type liquid crystal display device 38 in the embodiment of the present invention shown in FIG. 7 comprises an upper frame 48 which picturizes a display window 46 for picturizing an effective frame of the transmission type liquid crystal display device 38, the back-light unit 26 according to the present invention and the liquid crystal panel 40 disposed between the upper frame 48 and the back-light unit 26.

As shown in FIG. 7, the back-light unit 26 mounted on a lower case 50 constitutes the transmission type liquid crystal display device 38 by being supported with the upper frame 48 in a united body. Since the above-described back-light unit 26 uses the prism sheet 10 according to the present invention, light from the light source 28 is irradiated effectively onto the liquid crystal panel 40 to make it possible to provide a liquid crystal display with high brightness and high contrast. Further, by using the prism sheet 10 according to the present invention, the electric power applied to the light source to provide a liquid crystal display of the same level as that of a conventional liquid crystal display may be reduced or a light source consuming a few electric power may be used. Consequently, the transmission type liquid crystal display device enabling energy consumption and a compact design is provided.

The design of the higher order surface 18 of the prism sheet 10 according to the present invention will be described in details.

Figure 8:
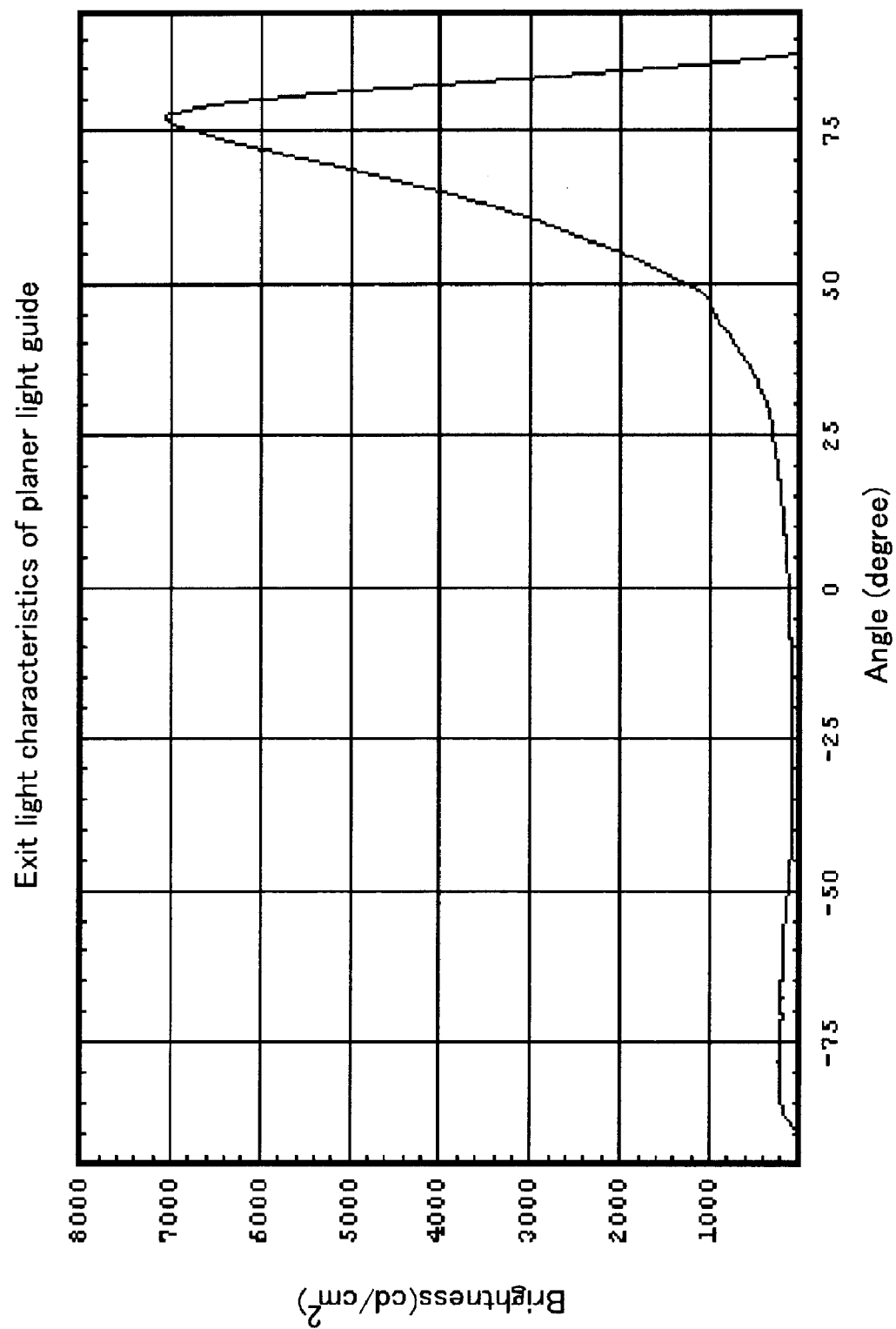
FIG. 8 is a view showing a typical distribution characteristic of exit light from the planer light guide.

Section 3: Design of Higher Order Surface Adopted to Prism Sheet According to Present Invention FIG. 8 shows characteristics of an exit light distribution from the planer light guide having directionality used in the representative transmission type liquid crystal display device. Any exit light characteristics may be used in principle for the planer light guide according to the present invention. In particular, exit light characteristics may be applied effectively to the planer light guide having high directionality shown in FIG. 8. Further, a peak angle of the exit light characteristics is not limited to 77 degrees. A planer light guide having any peak angle may be used as long as the peak angle may be coped with in consideration of manufacturability.

As shown in FIG. 8, exit light from the planer light guide used in a specific embodiment of the present invention has an intensity tensile peak at 77 degrees and the full width at half maximum of the exit light is about 20 degrees. In addition, an angle of exit light from the planer light guide described in FIG. 8 and thereunder is defined to be measured clockwise assuming that the normal direction of the planer light guide is 0 degree and a direction to the light source is −90 degrees.

As shown in FIG. 8, exit light from the planer light guide is launched with a predetermined angle range and characterized by being aslant extremely against the normal direction of the planer light guide, i.e., the direction to the liquid crystal panel. Further, FIG. 8 shows that the exit light has a narrow full width at half maximum of an angle and high directionality. In order to deflect light from the above-described planer light guide efficiently to the liquid crystal panel for contribution to the brightness of the liquid crystal panel, the prism structures of the prism sheet are preferably facing the planer light guide side as described hereunder.

Figure 9:
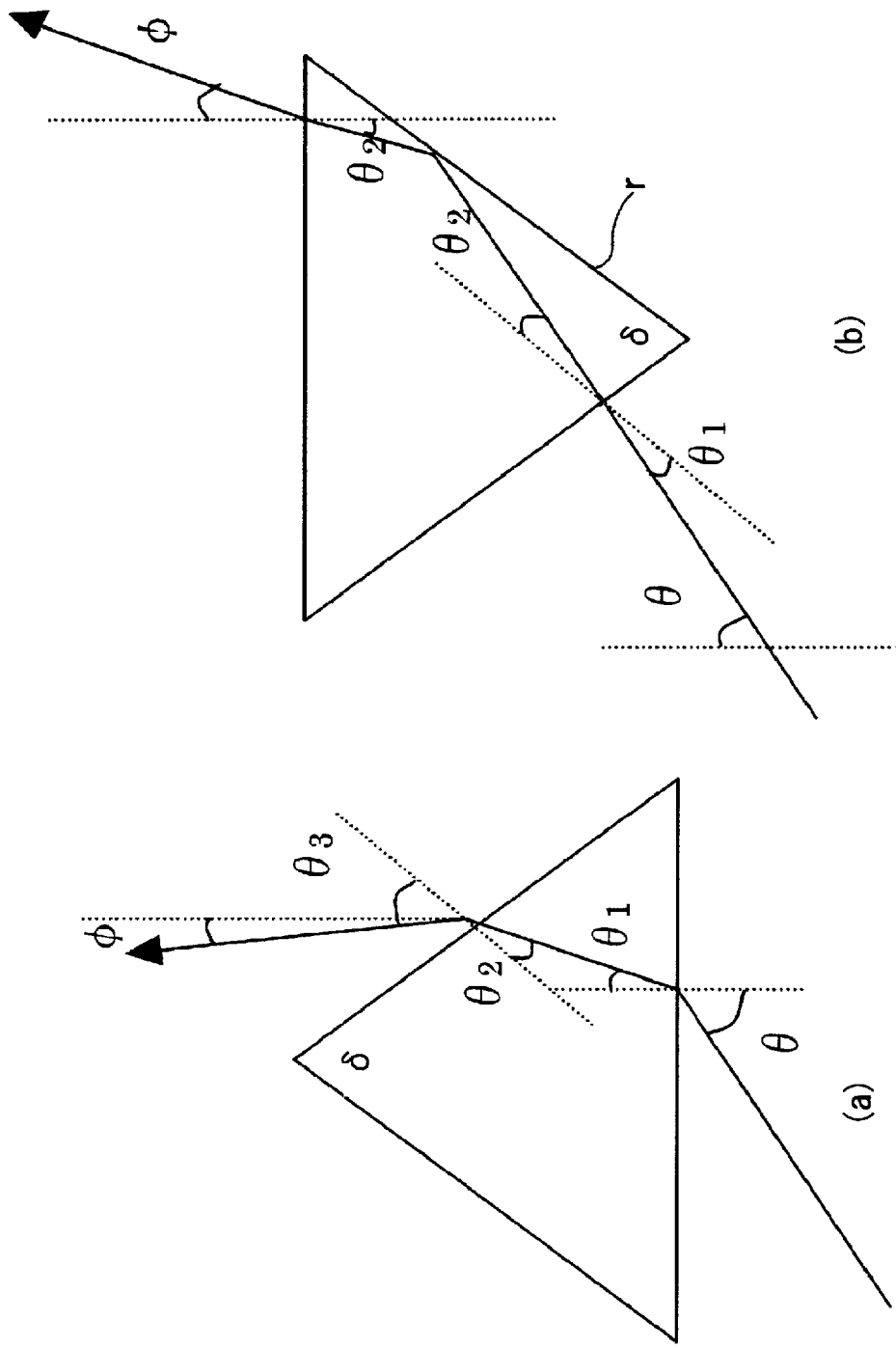
FIG. 9 is a view showing deflection of light by directions of prism structures on the planer light guide having high directionality.

That is to say, a resin used to manufacture prisms in general is a transparent acrylic resin having a refractive index within a range of 1.49 to 1.56. FIG. 9 is a view showing deflection of light depending on a direction of prism structures on the planer light guide having high directionality. According to the present invention, an angle of light launched from the planer light guide is defined to θ and an angle of a light launched from a prism is defined to φ. FIG. 9 shows a layout of prism structures corresponding to the angle definitions. In FIG. 9, FIG. 9(*a*) shows an action of light when the prism structures are formed to face up and FIG. 9(*b*) shows an action of light when the prism structures are formed to face down.

As shown in FIG. 9(*a*), when the prism structures are formed to face up, each prism structure is formed into an equilateral triangle with a top of the prism defined to δ and when the equilateral triangle is formed so that the vertical angle thereof faces up, the bottom angle is (π−δ)/2. The relationship between the angles is represented by the following formula:

$$\sin\theta_1 = \frac{1}{n}\sin\theta \qquad \text{[Formula 1]}$$

$$\theta_2 = \frac{\pi - \delta}{2} - \theta_1$$

$$\sin\theta_3 = n\sin\theta_2$$

$$\phi = \frac{\pi - \delta}{2} - \theta_3$$

Figure 10:
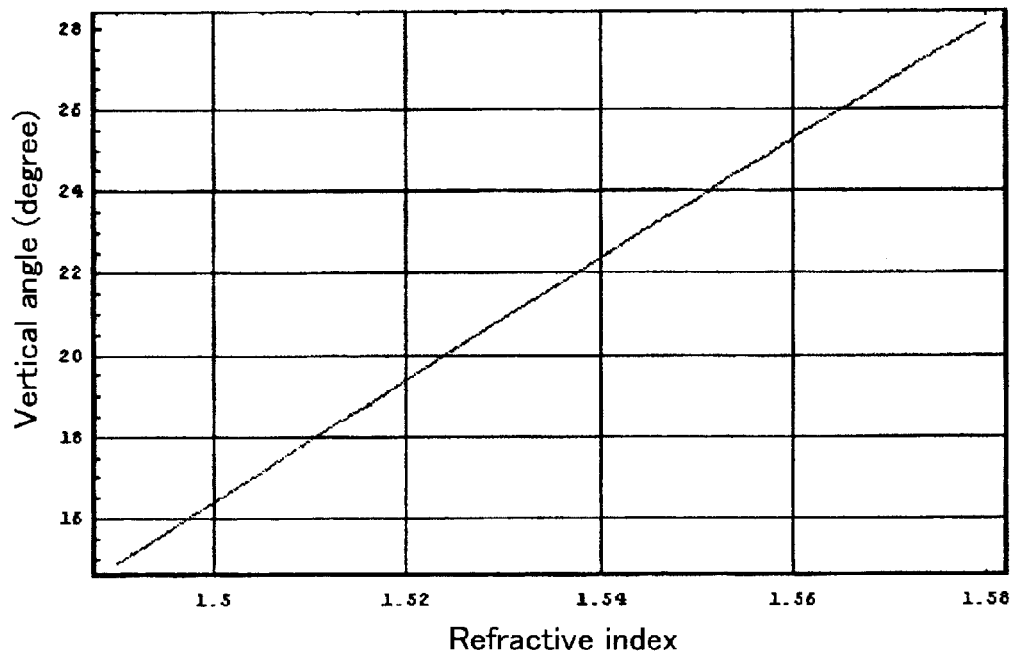
FIG. 10 is a graph showing a relationship between a refractive index and a vertical angle required to direct light at 77 degrees to the front side.

(wherein parameters represent the angles shown in FIG. 9(*a*)). FIG. 10 is a graph showing the relationship between a refraction index and a vertical angle required to direct light at 77 degrees to the front side when the above formula is used. As shown in FIG. 10, in the range of the refraction index of the above-described acrylic resin, the vertical angle δ of an upward prism structure is limited to the range of 20 to 30 degrees and the vertical angle is therefore extremely sharp.

The prism sheet adopting the layout shown in FIG. 9(*a*) has disadvantages of extreme difficulty in creating a metal mold thereof, incomplete separation of the top portion from the metal mold after the sheet is formed by employing the injection mold method or the compression mold method and a low yield rate. This means that efficiently directing light having directionality to an upper direction in the figure, i.e., the direction to the liquid crystal panel, is actually impossible. The above-described conditions also apply to asymmetric triangles other than the symmetric triangle shown in FIG. 9(a).

On the other hand, when an equilateral triangle of a downward prism structure having a vertical angle of δ is considered in the same manner, the relationship between the angles shown in FIG. 9(b) is represented by the following formula:

$$\theta_1 = \theta - \frac{\pi}{2} + \frac{\delta}{2}$$
$$\sin\theta_2 = \frac{1}{n}\sin\theta_1$$
$$\theta_3 = \frac{3}{2}\delta - \theta_2 - \frac{\pi}{2}$$
$$\sin\phi = n\sin\theta_3$$

[Formula 2]

Figure 11:
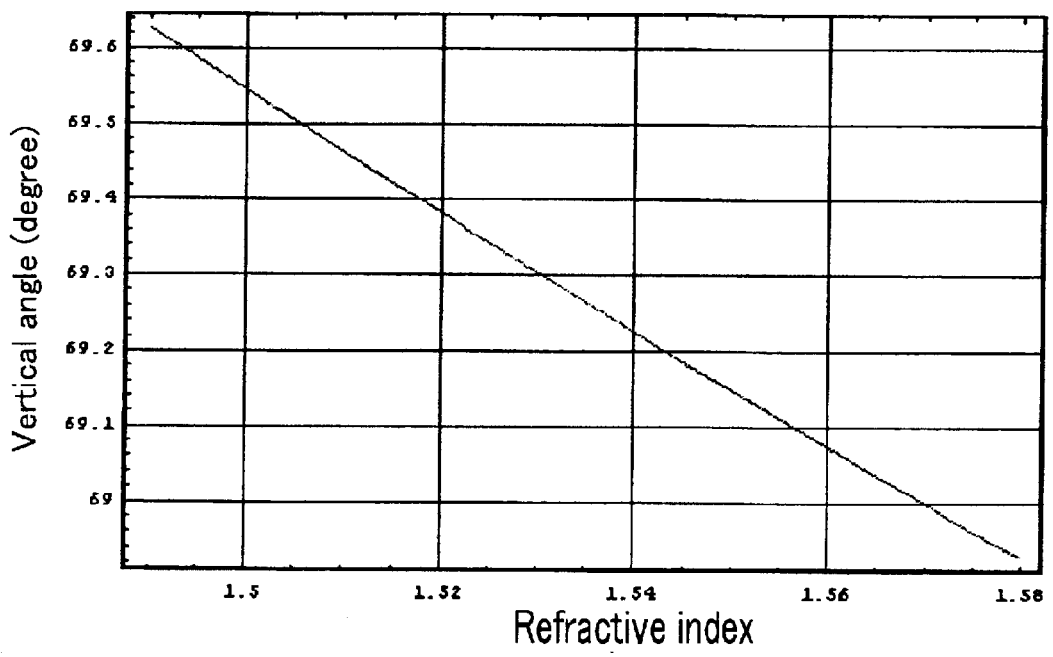
FIG. 11 is a graph showing a relationship between a refractive index and a vertical angle in a downward type prism structure shown in FIG. 9(b).
Figure 12:
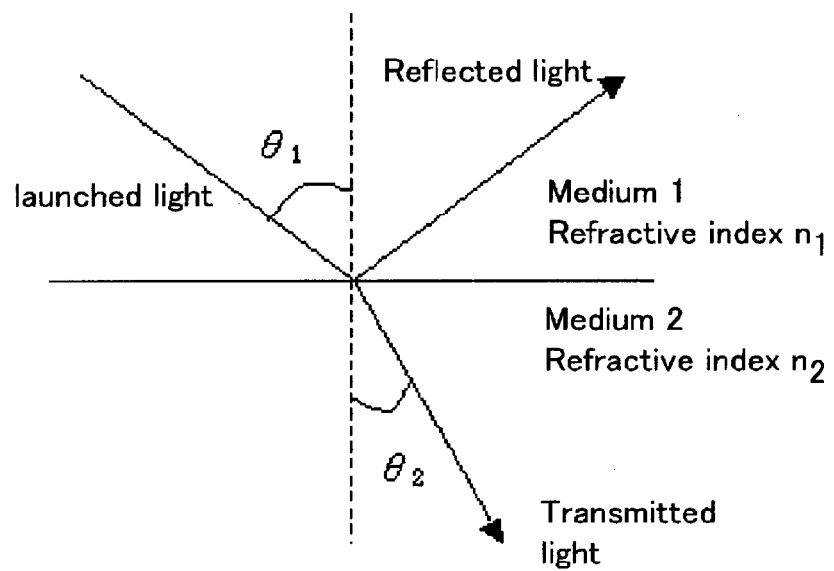
FIG. 12 is a view showing a relationship between parameters used for the present invention.

FIG. 11 is a graph showing a relationship between a refractive index and a vertical angle of the downward prism structure shown in FIG. 9(b). The graph shown in FIG. 11 shows that the vertical angle of the prism structure may be increased to 60 to 70 degrees when light is reflected on a side r of the prism for deflection. Accordingly, when a planer light guide providing exit light having high directionality is used, it is effective to form prism structures facing down and, at the same time, light is reflected on side surfaces r of the prisms.

Further, in consideration of a transmittance with reference to FIG. 9, when prism structures are formed to face up, light needs to be refracted twice and an overall transmittance is determined by a product of transmittance values at interfaces. When prism structures are formed to face down, there are two refractive interfaces as those of the upward type prism structures and FIG. 9(b) shows addition of one reflective surface to the prism structures. According to the present invention, a reflectance may be made 100% by setting angles of the prism structures so that the reflective surface r shown in FIG. 9(b) reflects launched light perfectly. Consequently, the efficiency may be prevented from deterioration caused by addition of reflection.

Figure 13:
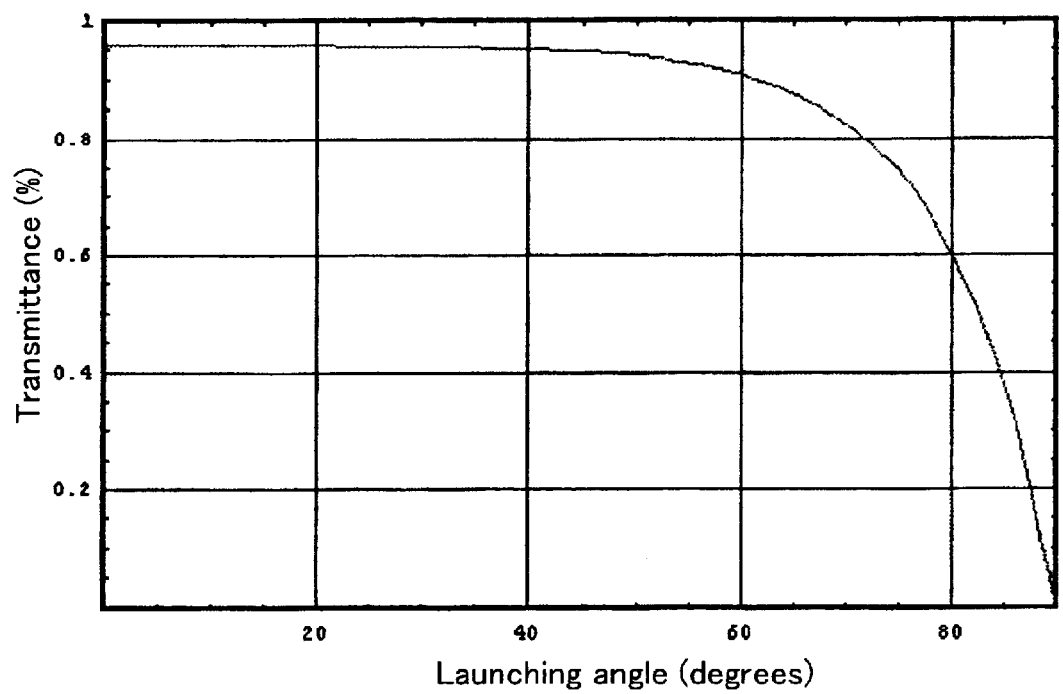
FIG. 13 is a view showing a result of estimating transmittance of a downward prism sheet by employing a representative refractive index of an acrylic resin 1.521.
Figure 14:
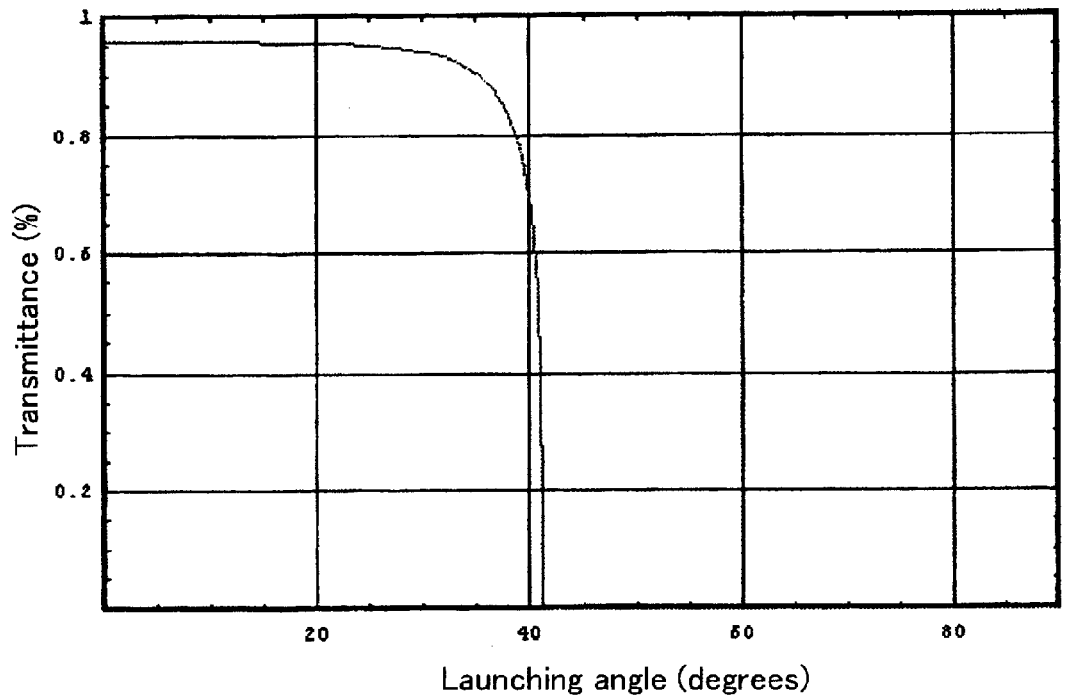
FIG. 14 is a view showing a result of estimating transmittance of the downward prism sheet by employing a representative refractive index of an acrylic resin 1.521.

FIGS. 13 and 14 show results of estimating the transmittance of the downward type prism sheet by employing a refractive index of 1.521 of a representative acrylic resin. FIG. 13 shows a case wherein light propagates from atmospheric air into a medium. FIG. 14 shows a case wherein light propagates from a medium into atmospheric air. When light propagates from a medium into atmospheric air, it is known that the light is reflected perfectly and the reflectance is 100% at a larger angle than the angle (critical angle) determined by the formula below. When the refractive index of 1.521 is used, the critical angle given by the formula below is 41 degrees. When prism structures are formed to face down, the prism plane may be configured so that reflection thereon always satisfies the perfect reflection condition and no extreme disadvantage is therefore caused when an acrylic resin is used in particular.

$$\theta c = \arcsin\left(\frac{1}{n}\right)$$

[Formula 3]

A shape of a prism structure will be studied. In general, a prism structure having a triangle cross-sectional shape has hitherto been used. In this case, various shapes of triangles are adopted, for example, an equilateral triangle and asymmetric triangle have been proposed as aforementioned. As aforementioned, use of the prism sheet comprising prisms having polygonal cross-sectional shapes or prisms having sides formed of curved lines have hitherto been enumerated. However, any of these prism sheets is capable of adopting a structure for perfect reflection and cannot deflect launched light having a peak in an oblique direction (60 to 80 degrees) to the normal direction of the planer light guide, i.e., upper side of the figure.

The present inventors were led to the present invention from finding out that light from a light source such as a planer light guide having directionality may be deflected efficiently to the front side by combining straight lines and curved lines. By this combination surfaces forming prism structures in a pair with other sides formed of straight lines are formed into high order surfaces to use the perfect reflection. The prism sheet according to the present invention will be described based on the principle of the present invention while taking into geometric consideration of prism structures.

Figure 15:
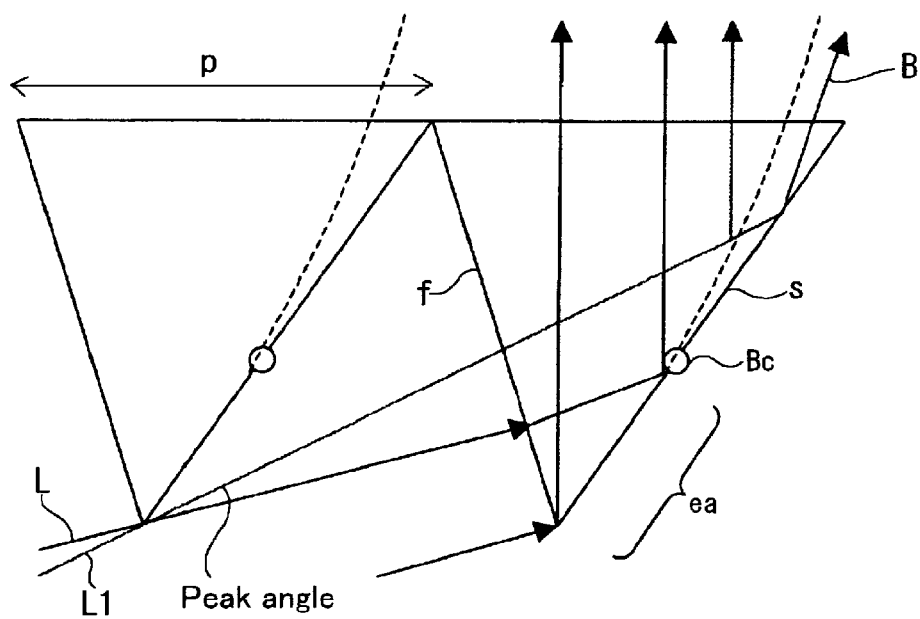
FIG. 15 is a view showing an action of light when prism structures are formed of triangles.

In order to deflect light from the planer light guide efficiently to the normal direction of the planer light guide toward the liquid crystal panel side, an angle of an oblique surface is determined according to a peak angle of an exit light from the planer light guide for triangular or polygonal prisms. FIG. 15 is a view showing an action of light when prism structures are formed of triangles. Light L with a peak angle of exit light from the planer light guide is launched to prisms while being refracted on the first surface f and then deflected to the normal direction after being reflected perfectly on the second surface s. Since prism structures of the same shapes are disposed in parallel at pitches p, light L at an angle of an intensity peak is reflected by only an effective area ea of the second surface s and then deflected to the front side. Accordingly, light at a smaller exit angle than the peak angle, i.e., light launched at a larger launching angle for prism structures is reflected above the effective area ea shown in FIG. 15.

The end of the upper side of the figure of the effective area ea constitutes the end portion 22 a shown in FIG. 3. This end portion 22a is hereinafter defined to a connection point Bc in this section.

According to the present invention, when a surface other than a planer surface 22 is adopted as a small curvature surface, the connection point Bc may be defined as a position whereon light L at an intensity peak of light launched with a predetermined angle distribution is reflected by the higher order surface 18. Further, from a viewpoint of practical use, a connection point Bc may be selected appropriately as a point on the higher order surface 18 in the vicinity of the connection point Bc within the range of reflecting light within a range of full width at half maximum (FWHM) of an intensity peak in angle distribution of launched light. In the present invention, the x coordinate of the connection point Bc is hereinafter refers to as Bcx and the y coordinate is hereinafter refers to Bcy. The light from the connection point Bc to the upper side of the figure indicated by an arrow L1 is launched to a direction shifted from the normal direction as indicated by an arrow B in FIG. 15 because the second surface s is optimized for the peak angle when the present invention is not applied. The same condition is also applicable when polygons are adopted simply as prism structures. Accordingly, it can be said that prism structures having reflective surfaces formed of only simple straight lines cannot provide a sufficient efficiency.

Further, it can be thought that the entire second surface s is formed of a curved line. However, peak angles of exit light from the planer light guide cannot be all directed to the normal direction and the overall reflection efficiency is therefore deteriorated instead. In order to deflect the light having high directionality shown in FIG. 8 efficiently to the normal direction, it is found out by the present invention that forming the higher order surface of straight lines and curved lines allows the most effective use of light from the light source. That is to say, since light L at a peak angle from the light source is thrown onto only an effective area ea, the surface is formed of a straight line at an angle optimized to the peak angle in the effective area ea, and, on the other hand, the angle of the surface is preferably changed dynamically to face the front side as indicated by the curved surface shown by the dashed line in FIG. 15.

In the upper portion than the connection point Bc in FIG. 15, an angle of exit light allowing the highest brightness is a little bit smaller angle than the peak angle, and the intensity of the exit light reduces smoothly as the same is being separated farther from the peak angle. Therefore, the upper portion than the connection point Bc is preferably formed into a curved line having an angle changing continuously in principle. However, the present invention makes it possible to approximate the curved line with a plurality of planer surfaces and arcs. In addition, the specific embodiment for approximating the curved line with arcs will be described in more details.

Figure 16:
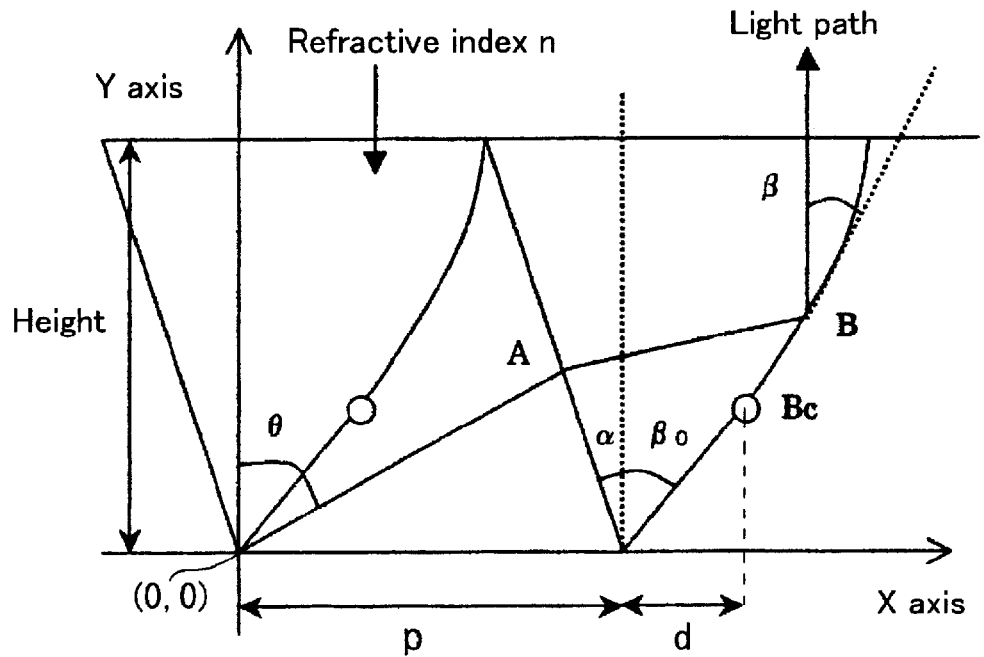
FIG. 16 is a view showing parameters used for the present invention.

A design of prism structures comprising higher order surfaces adopted to the present invention will be described in details. Parameters used to design prism structures comprising the higher order surfaces are a peak angle ($\theta$ peak) of light from the planer light guide, refractive indices of prisms (n) and vertical angles of prisms. A vertical angle of a prism is defined assuming that an angle of an oblique surface (first side surface f) of a side whereto light is launched against the normal line is $\alpha$ and an angle of an oblique surface on the opposite side (a surface comprising straight lines and curved lines; second side surface s) is $\beta$. FIG. 16 and the following table show all the parameters used for the present invention.

TABLE 1

[Parameters Used for Designing Prism Structures]

| | |
|---|---|
| Pitch: | pitch |
| Height: | height |
| Refractive index of material: | n |
| Angle of launched light: | $\theta$ (angle from the normal direction) |
| Peak angle of launched light: | $\theta$ peak |
| Angle of launching side surface of vertical angle: | $\alpha$ |
| Angle of opposite surface of vertical angle: | $\beta_0$ |
| Angle of curved line on point B: | $\beta$ (continuously changes against $\theta$) |
| Origin (0, 0): | Top of adjacent left prism structure |
| Difference between connection point Bc and prism top: | d |

As shown in FIG. 16, a point A is a point whereon launched light passes through the first side surface f and a point B is a point whereon light which has passed through the first side surface f is reflected on the second side surface s. Further, the connection point of a planer surface portion and a curved line portion is represented by Bc in FIG. 16.

As shown in FIG. 16, when the prism sheet according to the present invention is designed, angles of tops of prisms are separately defined to $\alpha$ and $\beta$. Normally, $\beta$ may be determined uniquely against predetermined $\alpha$ from the relationship represented by the following formula.

Coordinates of Point A:

$$\begin{cases} \text{Formula of light} & y = \dfrac{x}{\tan\theta_{peak}} \\ \text{Formula of prism surface} & y = \dfrac{-1}{\tan\alpha}(x - \text{pitch}) \end{cases} \quad \text{[Formula 4]}$$

By resolving the above simultaneous equations, the position coordinate of the point A is determined as the following formula:

$$Ax = \frac{\text{pitch} * \tan\theta_{peak}}{\tan\alpha + \tan\theta_{peak}}, \, Ay = \frac{\text{pitch}}{\tan\alpha + \tan\theta_{peak}} \quad \text{[Formula 5]}$$

$(\text{pitch} = Bcx - d)$

Coordinates of Point Bc:

Light refracted on the point A propagates through a medium and an angle thereof is given by the following formula from the Snell's law:

$$\sin\phi_1 = n * \sin\phi_2 \quad \text{[Formula 6]}$$

$$\left(\phi_1 = \theta - \frac{\pi}{2} + \alpha\right)$$

Since light reflected on the high-order surfaces on the point B is directed to the normal direction of the planer light guide, the condition of the following formula need be satisfied:

$$\frac{\pi}{2} + \phi_2 - \alpha = 2\beta \quad \text{[Formula 7]}$$

Figure 17:
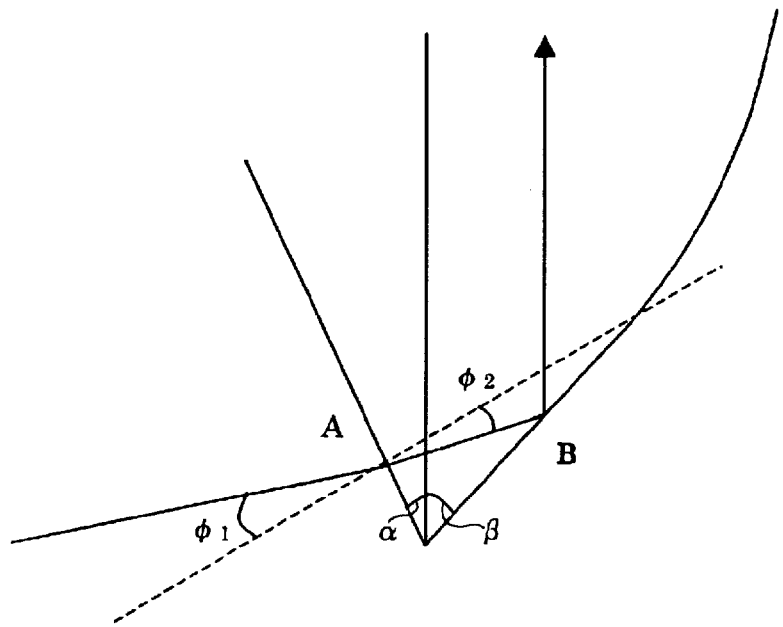
FIG. 17 is a view showing a relationship between a point A and a point B on side surfaces f and s of a prism structure, and angles.

By the above formula, $\beta$ is determined uniquely by $\alpha$. In addition, FIG. 17 shows the relationship between the above-described points A and B and the angles.

The point Bc corresponds to the point B determined according to $\theta$ peak and the coordinates thereof may be obtained as resolutions of the following simultaneous equations:

$$\begin{cases} y = \dfrac{1}{\tan\beta}(x - \text{pitch}) \\ y = \tan(\alpha - \phi_2)(x - Ax) + Ay \end{cases} \quad \text{[Formula 8]}$$

and given by the following equation:

$$Bcx = \frac{\dfrac{\text{pitch}}{\tan\beta} + Ax * \tan(\alpha - \phi_2) + Ay}{\dfrac{1}{\tan\beta} - \tan(\alpha - \phi_2)}, \quad \text{[Formula 9]}$$

$$Bcy = \frac{(Ax + \text{pitch})\tan(\alpha - \phi_2) + Ay}{1 - \tan\beta\tan(\alpha - \phi_2)}$$

$(\text{pitch} = Bcx - d)$

The relationship between $\alpha$ and $\beta$ at $\theta$ peak will be described in more details.

Figure 18:
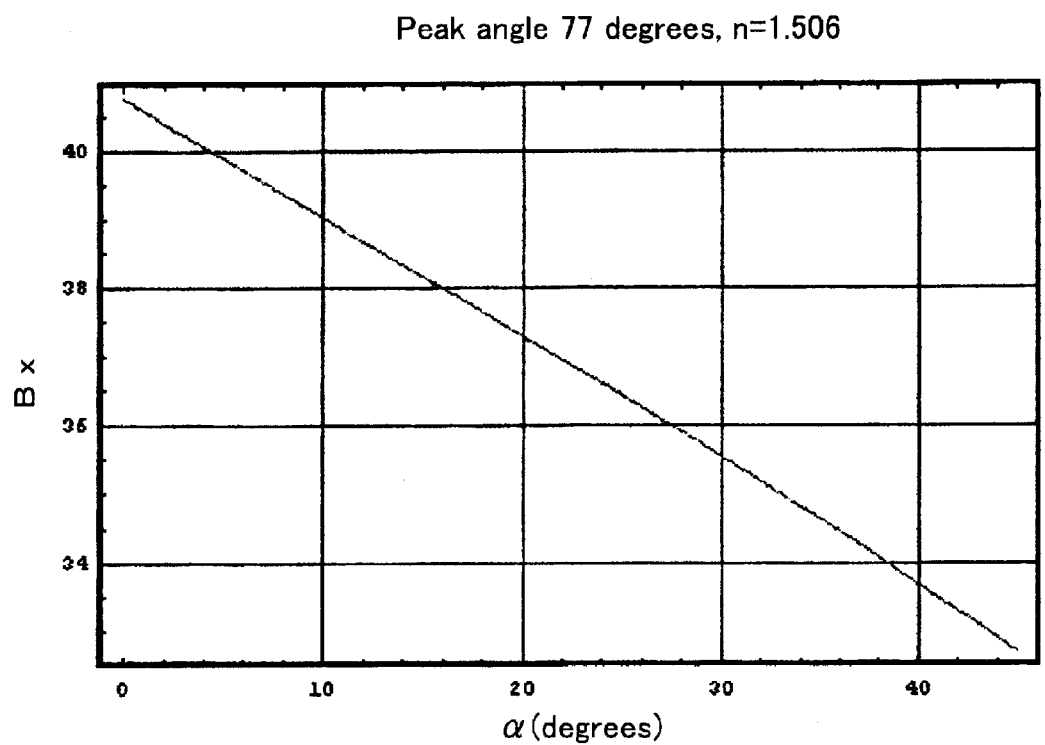
FIG. 18 is a view showing a relationship between Bcx and α calculated according to the present invention.
Figure 19:
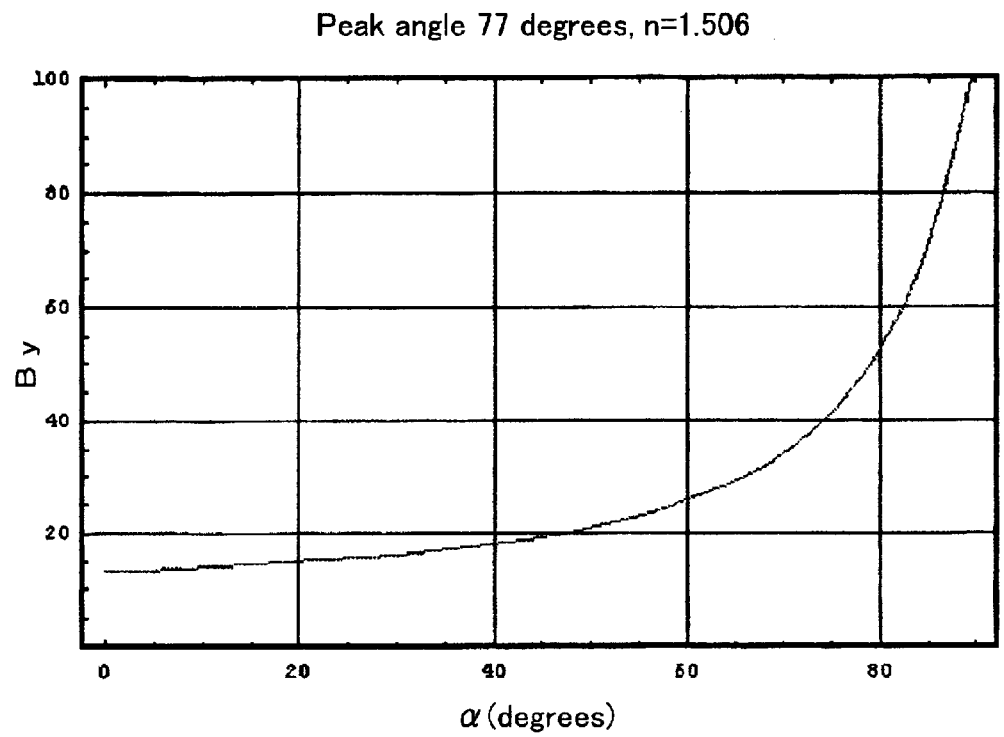
FIG. 19 is a view showing a relationship between the Bcy and α according to the present invention.

FIG. 18 shows the relationship between calculated Bcx and α. FIG. 19 shows the relationship between calculated Bcy and α. Coordinates of the connection point Bc may be defined from the above-described relationships. A curved surface or a curved line starting from the connection point Bc may be defined as follows. Namely, exit light from the planer light guide may be determined by making the exit light propagate through a top of a prism, which is an origin of coordinate axes, and changing β along with reduction of the launching angle of the light from θ peak as shown in FIG. 8. That is to say, it is important to know the relationship of β to θ (launching angle). From this β which is determined by α, it is known that α is a main parameter dominating a shape of a higher order surface used for the present invention.

Figure 20:
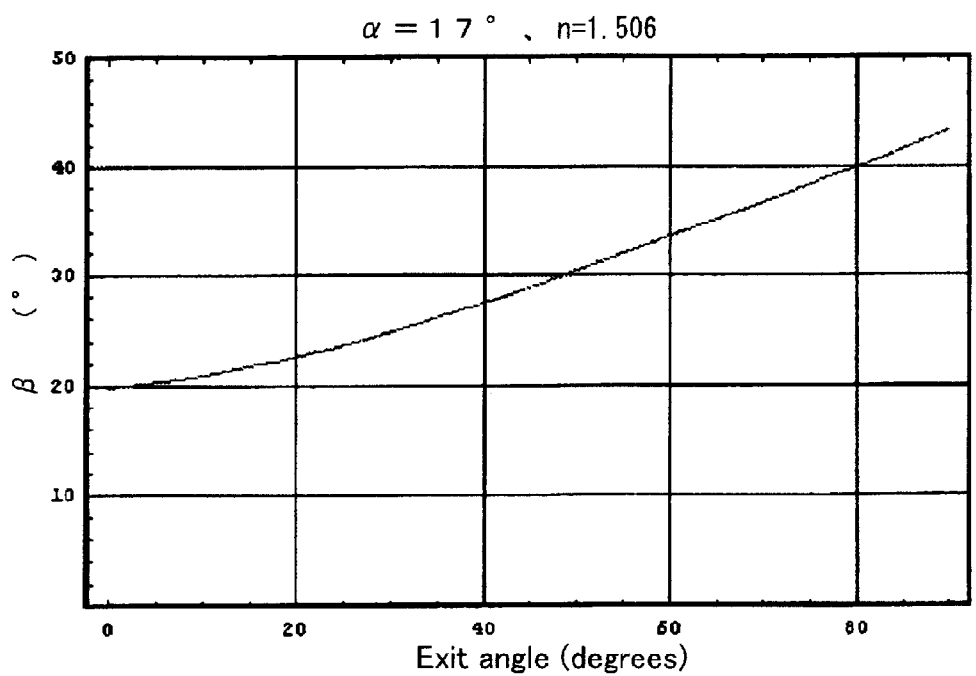
FIG. 20 is a view showing a result of simulating a relationship between θ and β when α is 17 degrees.

FIG. 20 shows a result of simulating the relationship between θ and β when α is 17 degrees. As shown in FIG. 20, it is known that β need be increased along with increase of the launching angle θ. Therefore, in a preferable embodiment of the present invention, a portion of the curved line 24 may be defined to a curved surface having a curvature increasing gradually according to a launched light characteristic of the light source.

Figure 21:
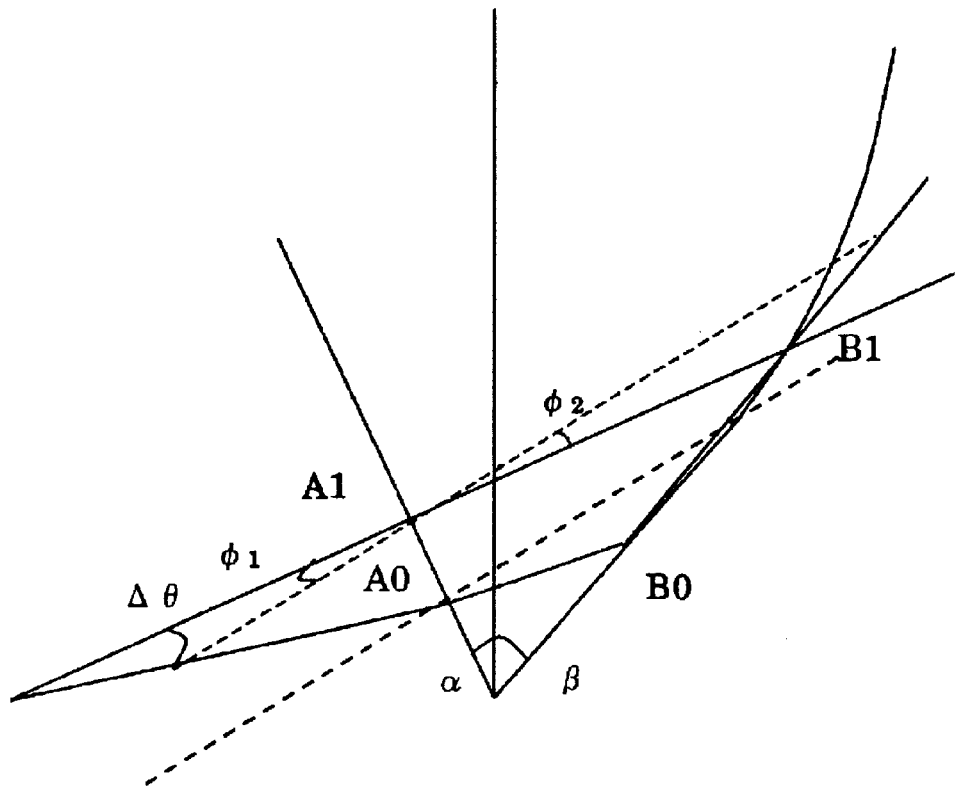
FIG. 21 is a view showing design steps for a specific curved line portion according to the present invention.

The design of the specific curved line portion according to the present invention may be achieved by adopting the following steps with reference to FIG. 21. Primarily, define the point Bc to $B_0$ and then sequentially define $B_1$, $B_2$, . . . .

(1) Determine α.

(2) Determine coordinates of the point Bc ($B_0$) against α. The top and the point Bc are connected with a straight line.

(3) Obtain the relation between θ and β.

(4) Assume that a notch width is ▯θ, obtain $φ_2$ at θ−▯θ and assume that an intersection of a straight line having an ingredient of $φ_2$−α through the point $B_0$ and an ingredient π/(2−β) is a next point $B_1$.

(5) Thereafter, obtain the point $B_2$ based on the point $B_1$ in the same manner and repeat the same operation.

According to the present invention, an ideal curved surface may be further obtained by determining γ sequentially by replacing θ peak by θ in general. That is to say, the ideal curved surface according to the present invention may be obtained by determining γ sequentially so that the conditions of the following formula are satisfied:

$$\gamma(\theta) = \frac{\pi}{4} - \frac{\alpha}{2} + \frac{1}{2}\phi(\theta) \quad \text{[Formula 10]}$$

$$\phi(\theta) = \sin^{-1}\left\{\frac{1}{n}\sin\left(\alpha + \theta - \frac{\pi}{2}\right)\right\}$$

According to the present invention, the curved line portion may be designed by simply repeating the above-described procedures for the required number of times. However, an ideal curved line may be approximated with arcs or straight lines closest to the above-described curved line according to the present invention. Approximation of the above-described curved line with arcs will be described specifically. In this case, since the curved line need be connected smoothly to the straight line portion on the point $B_0$, the arcs are approximated with the following parameters:

When an arc having a curvature center of ($c_1$, $c_2$) and a curvature radius R is used, the relationship represented by the following formula is satisfied:

$$(c_1, c_2) = \frac{R}{\sqrt{By^2 + (\text{pitch} - Bx)^2}}(By, \text{pitch} - Bx) + (Bx, By) \quad \text{[Formula 11]}$$

Therefore, the only independent parameter is R and approximation may be performed with the arc formula represented by the following formula:

$$(x-c_1)^2+(y-c_2)^2=R^2 \quad \text{[Formula 12]}$$

As a result of an enthusiastic study, the present inventors found out that an equal efficiency in practical use to that of a higher order surface formed of ideal curved lines even when the curved line portion is approximated with arcs.

Figure 22:
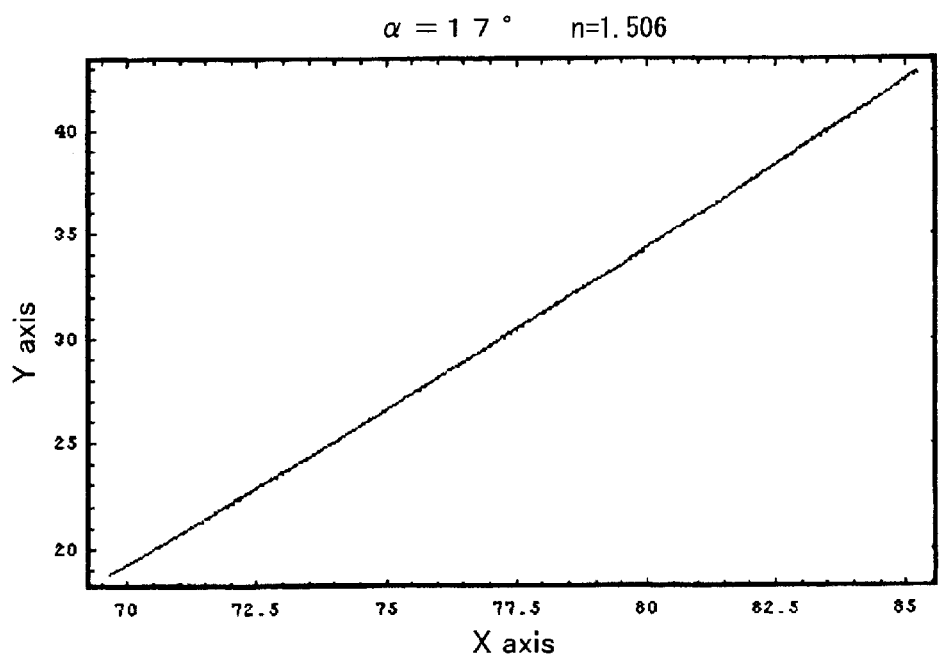
FIG. 22 is a view showing a residual between a curved line portion for a light source having an exit light characteristic shown in FIG. 8 and an approximate curved line based on an ideal curved line and arc approximation in a case of a prism structure having a vertical angle of 55 degrees.

FIG. 22 shows a residual between the ideal curved line and the approximate curved line based on arc approximation regarding the curved line portion against the light source having the launched light characteristic shown in FIG. 8 for a prism structure having a vertical angle of 55 degrees. As shown in FIG. 22, there is scarcely a residual between the both curved lines even when arcs are used for approximation, and fine approximation is possible. Further, according to the present invention, the ideal curved line may be approximated with a plurality of minute planer surfaces as shown in FIGS. 3(b) and 3(c) although the efficiency somewhat deteriorates.

Section 4: Study of Simulation of Reflection Property of Prism Sheet According to Present Invention Shapes of prism structures obtained as aforementioned for the present invention were used for three-dimensional simulation of light tracing.

When the prism sheet is actually disposed in the liquid crystal display device, the diffusing plate is mounted on a predetermined position above the prism sheet as a general configuration to prevent unnecessary moiré. For this purpose, the diffusing plate having an approximated diffusion property assuming that light was scattered by Gaussian scatter based on a really measured value was disposed as a model for simulation.

Figure 23:
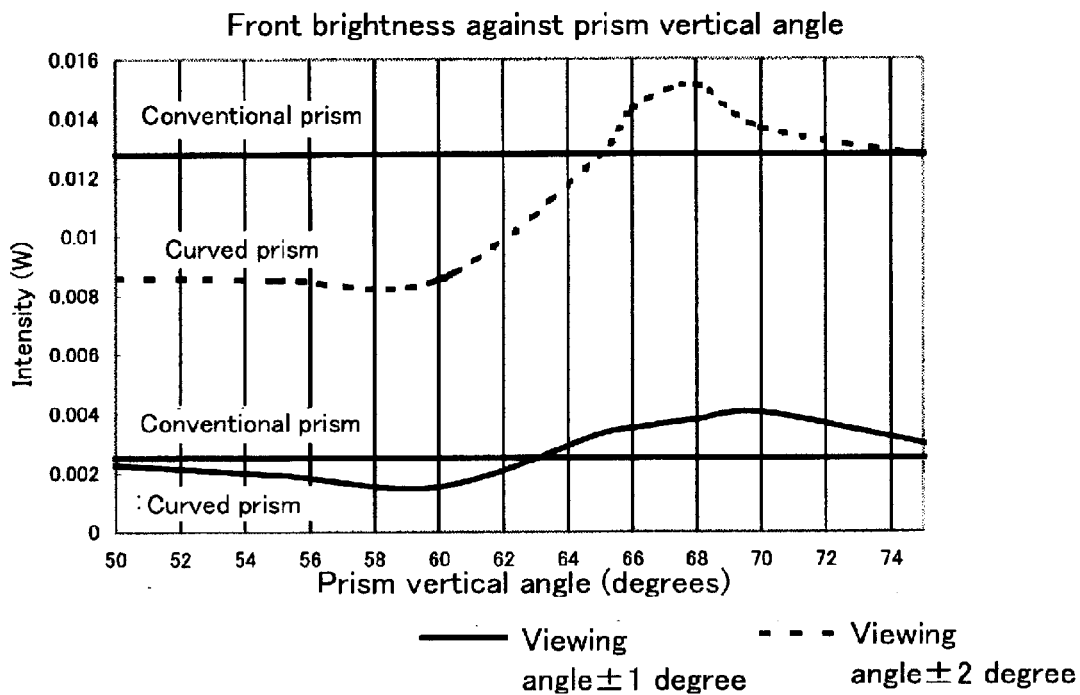
FIG. 23 is a view showing simulation of a transmitted light intensity assuming that a horizontal axis is a vertical angle of a prism structure and a vertical angle is the light intensity (w) at each visual angle.

The light source was assumed to have an intensity with angular distribution shown in FIG. 8. For the prism structure portion, a value designed by reflecting properties of the light source was used as was. Further, the diffusing plate was disposed on the opposite side to the light source beyond the prism sheet according to the present invention for simulation. Intensities of transmitted light with visual angles of ±1 degree and ±2 degrees was simulated when vertical angles of prism structures of the prism sheet according to the present invention were changed. Still further, the downward type asymmetric prisms disclosed in Japanese Patent Laid-Open Publication Heisei No. 11-84111 and other Japanese Patent Laid-Open Publications were also simulated for comparison. FIG. 23 shows the results of the simulations.

FIG. 23 is a view showing simulation of an intensity of transmitted light assuming that the horizontal axis is a vertical angle of a prism structure and the vertical axis is the intensity of the light (W) at each visual angle. Normally, in the transmission type liquid crystal display device, front brightness is often measured at a visual angle of 1 degree to 2 degrees. The straight line shows a result of simulating a downward type asymmetric prism adopted as an example of a conventional prism. The curved line shows a result of simulating the prism sheet according to the present invention.

As shown in FIG. 23, when the planer light guide having the exit distribution shown in FIG. 8 is used and a pitch between prism structures is assumed to be 50 μm, the highest front brightness is obtained at a vertical angle of about 68 degrees and it is known that this property gives a sufficient manufacturability. Further, as shown in FIG. 23, when the prism sheet according to the present invention is adopted, brightness at a predetermined visual angle may be improved for 1.2 to 1.5 times in comparison to that of the conventional prism sheet.

Figure 24:
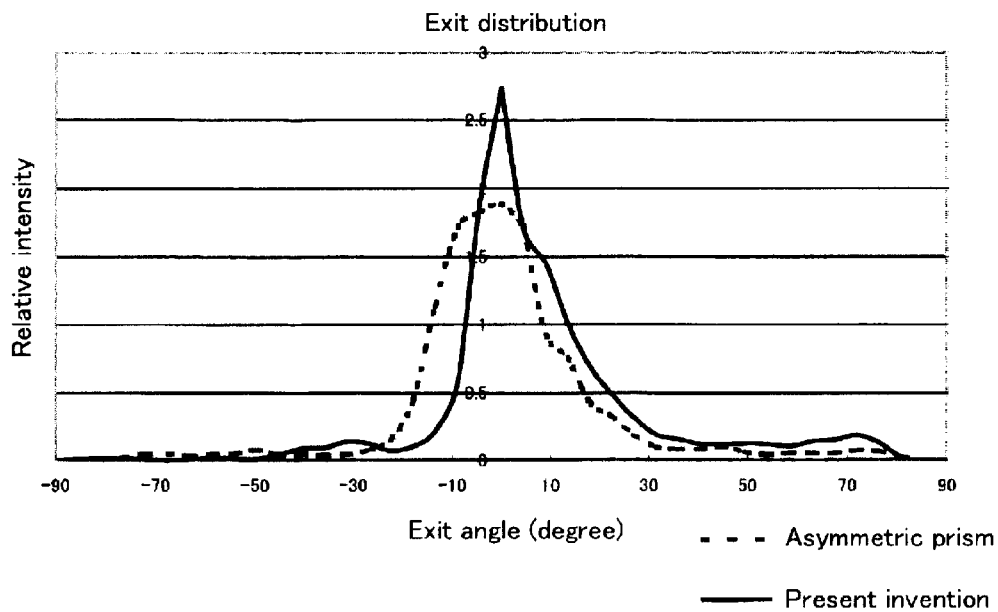
FIG. 24 is a view showing a result of comparing an exit distribution with that of a conventional prism sheet under the conditions shown in FIG. 23.

Further, FIG. 24 shows a result of comparing exit distribution under the conditions shown in FIG. 23. FIG. 24 shows that an intensity distribution becomes about 25 degrees for the conventional downward type asymmetric prisms at a full width at half maximum and about 12 degrees for the prism structures according to the present invention when the prism sheet according to the present invention is used and a full width at half maximum of an angle distribution of exit light is reduced to near half according to the present invention. According to the present invention in particular, the full width at half maximum of the angle distribution of the exit light is preferably no more than 15 degrees when the transmittance of the prism sheet is no less than 90% so that an excellent brightness characteristic may be added. Further, FIG. 24 shows that a peak intensity at a desired visual angle is improved at the same time by applying the present invention and that light may be condensed efficiently and the front brightness may be improved efficiently according to the present invention.

An embodiment of the transmission type liquid crystal display device 38 shown in FIG. 6 according to the present invention will be studied regarding the display characteristic provided by the present invention. In the transmission type liquid crystal display device 38 shown in FIG. 6, a lens element 40a is used. When the lens element 40a shown in FIG. 6 is used, a size of an image (l) is about l=d×2 sin (θ/2). Here, d represents a thickness of a glass substrate of the liquid crystal panel and θ represents a full width at half maximum of a spread angle of light launched to the liquid crystal panel. When d=0.7 mm and θ=12 degrees, l≈150 μm.

Accordingly, when the prism sheet 10 according to the present invention is adopted to the transmission type liquid crystal display device 38 according to a specific embodiment of the present invention shown in FIG. 6, the prism sheet 10 according to the present invention may be improved (angle distribution characteristic of exit light=full width at half maximum of 12 degrees). Further, a liquid crystal panel 40 formed on the glass substrate having a thickness of 0.7 mm is assumed to be used, a transmittance of light of a liquid crystal panel having pixels each sized no less than 150 μm may be improved. Still further, from the similar consideration, a glass substrate used frequently in recent years having a thickness of 0.5 mm or less is effective for a liquid crystal panel whereon further minutely pixels are formed. Furthermore, according to the present invention, since a spread angle range of light passing through a liquid crystal is narrow, disadvantages pointed out regarding to the conventional transmission type liquid crystal display device such as contrast inversion which is a major problem of light passing obliquely through a display element of a TN liquid crystal or the like may be improved.

Figure 25:
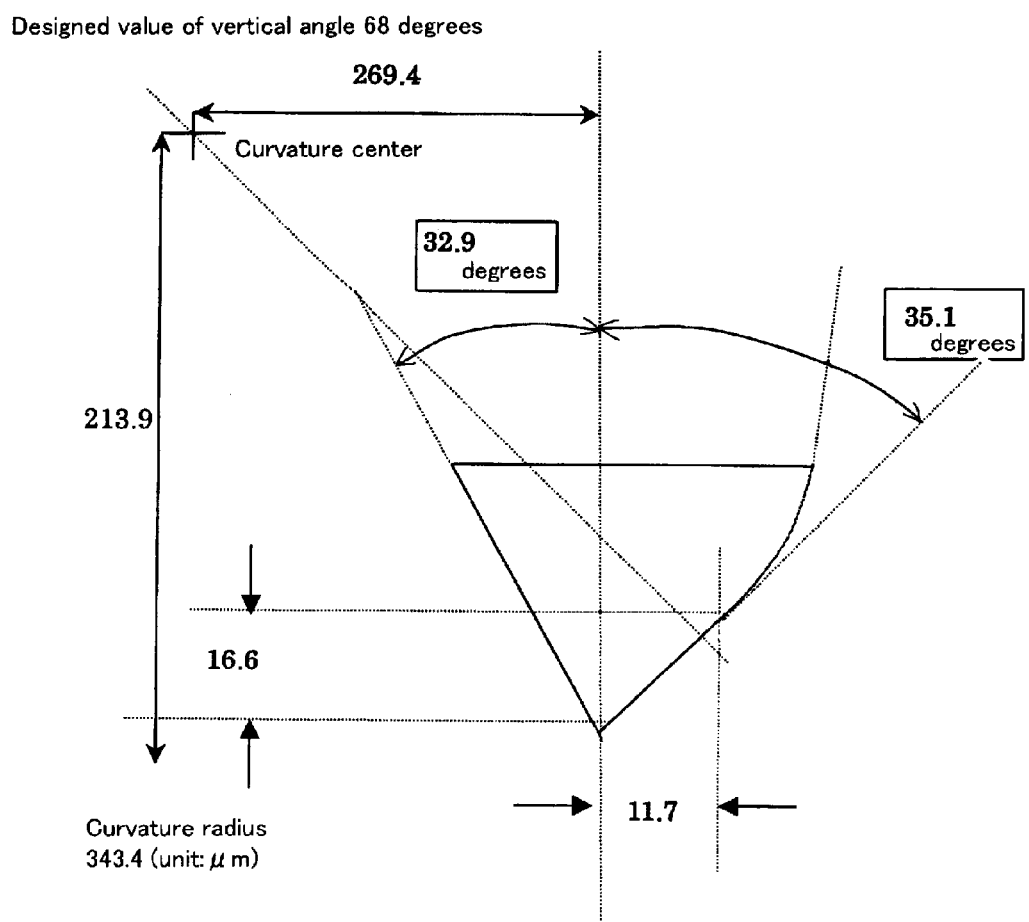
FIG. 25 is a view showing a prism structure formed with a pitch of 50 μm.
Figure 26:
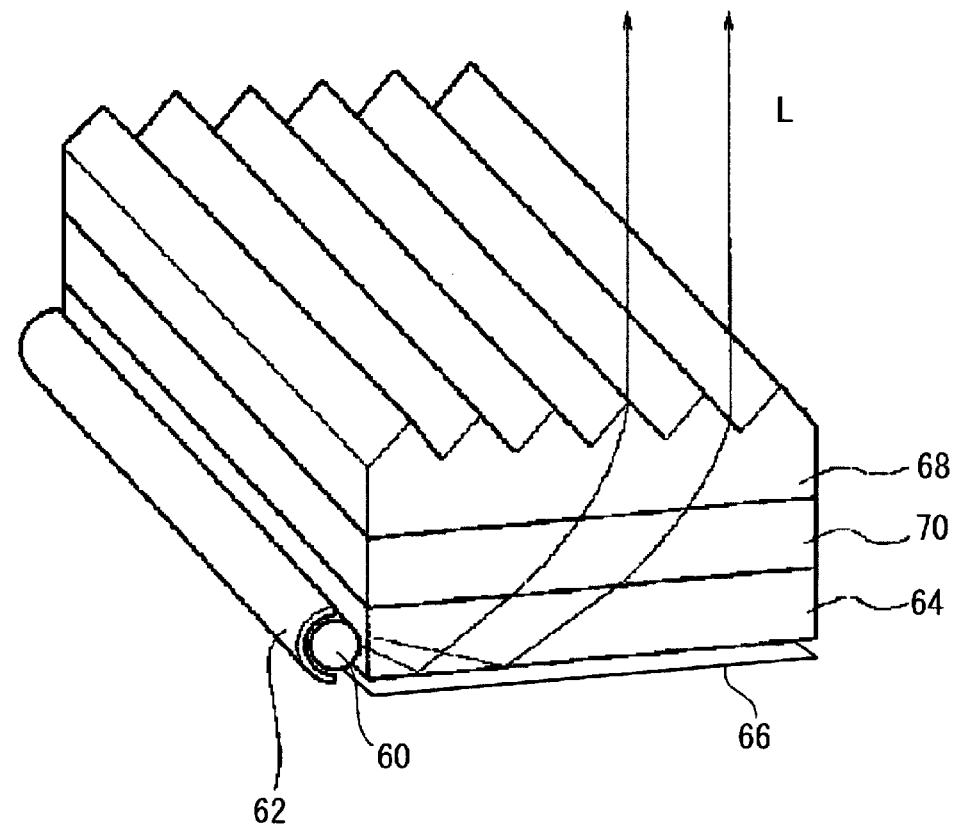
FIG. 26 is a view showing a conventional back-light unit of a side-light system.
Figure 27:
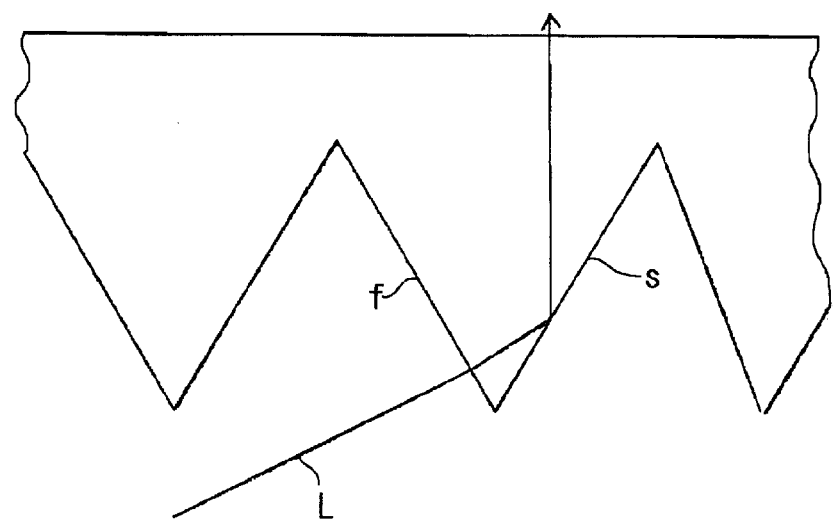
FIG. 27 is a view showing the commonest structure having a cross-sectional shape of an equilateral triangle of a conventional downward type prism sheet.
Figure 28:
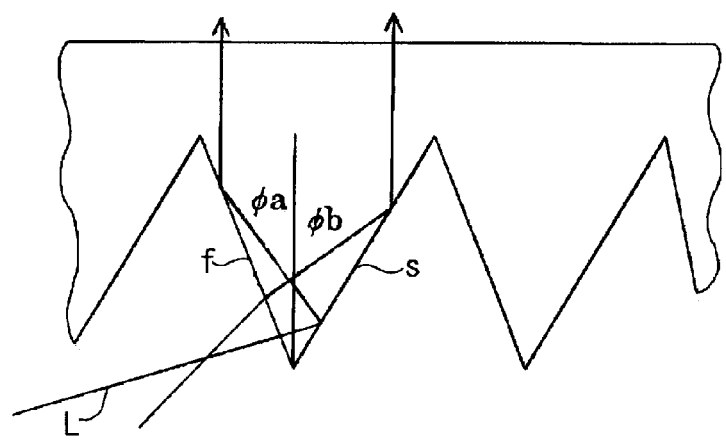
FIG. 28 shows an asymmetric prism sheet for improving brightness.

FIG. 25 shows a prism structure formed with a pitch of 50 μm as a specific embodiment of the present invention. As examples of methods of creating a prism having a size of tens of μm efficiently, the resin molding method, the injection molding method, the compression molding method, and the photopolymer method (hereinafter abbreviated to "2P method") are the most effective molding methods from the viewpoint of economic efficiency. Any of these methods uses a metal mold made of copper, nickel or the like or a plastic mold made of an epoxy resin, acrylic resin or the like and forms a replica of a base type prism. For this purpose, a negative shape mold is used for a desired prism shape.

As a method of creating the above-described negative mold made of meal, a method of creating the mold by direct cutting or processing a resin or a metal by cutting into the positive shape and thereafter negative nickel replica made by electroforming or the like may be enumerated. Further, when a positive shape may be created with a metal or a resin and thereafter the positive shape may be transcribed to a resin to create a negative resin mold. That is to say, transcribing the positive shape to a resin to create a negative resin mold. That is to say, when either a positive or negative shape related to the present invention may be processed by cutting, a prism sheet may be manufactured.

Manufacturing of the prism sheet according to the present invention will be described in further details. A diamond tool bit having the same shape as the cross-sectional shape of a prism structure according to the present invention is created and a negative mold is created by processing a 300 μ-thick copper-plated raw material by cutting to create a negative mold. The curved line provided by the present invention may be approximated excellently with arcs. Further, instead of creating the diamond tool bit as aforementioned, a sward tool bit may be used to cut curved portions of prism structures into groups of large numbers of minute planer surfaces to create a positive mold. In this case, a negative mold used for forming plastic may be created by electroforming.

When the photopolymer method is used, an acrylic 2P resin (e.g., 30Y266, manufactured by Three-Bond Co., Ltd.) and an ultraviolet light source can be used for exposure of about 1 J/cm$^2$ to harden the 2P resin and a shape of a metal mold is transcribed to the resin to create prisms on the substrate. Further, injection molding and compression molding may be used appropriately in addition to the above-described methods. Still further, a negative mold may be created by cutting a rolled raw material of a metal mold may be cut by lathe processing to create a negative mold and applying the 2P resin onto a film of polyethylene terephthalate or other polymer material, preferably winded as a roll, to form a prism sheet. Furthermore, according to the present invention, a negative mold created by electroforming from a plane positive mold may be bended into a roll and applied to continuous molding.

Summarization of the above description shows that the following effects may be obtained by the present invention.

TABLE 2

| | Front brightness | Full width at half maximum |
|---|---|---|
| Conventional prism | 1 | About 25 degrees |
| Curved prism | 1.2 to 1.5 | About 12 degrees |

That is to say, as summarized in Table 2, the present invention may provide prism structures capable of deflecting light from a back light having a directional launching property at an intensity peak of 60 to 80 degrees and a full width at half maximum of not more than 20 degrees efficiently to the front side and condensing light at about half of a full width at half maximum in comparison to conventional prism structures to improve the front brightness to 1.2 to 1.5 times.

Further, the present invention may provide the prism sheet having high efficiency of utilizing light, easiness of manufacturing and a function to improve directionality of light Still further, the present invention may provide the backlight unit and the transmission type liquid crystal display device realizing high brightness, high contrast, low power consumption, long battery life and a small size.

Furthermore, the present invention enables manufacturing prism sheets sufficiently capable of being produced in mass without a great increase of a cost.

The present invention has so-far been described based on specific embodiments. However, the present invention is not limited to the above-described specific embodiments. Further, regarding the present invention, the prism sheet used for the transmission type liquid crystal display device has been described as particular embodiments. It is needless to say however, that the present invention may be applied to optical components used to deflect obliquely launched light efficiently to the normal direction in addition to the prism sheet used for the transmission type liquid crystal display device

We claim:

1. A back-light unit comprising:
a light source for providing light exposed to a liquid crystal display panel of a transmission type liquid crystal display device,
a planar light guide for changing a direction of propagation of said light to said liquid crystal display panel, and
a prism sheet disposed adjacently to said planar light guide;
wherein said prism sheet comprises:
    continuous prism structures extending throughout a surface of the prism sheet in close proximity, each prism structure comprising:
    a sheet base;
    a sheet top; and
    a reflective surface element for reflecting the light to the liquid crystal display panel, said reflective surface element extending from said sheet base to said sheet top and wherein said reflective surface element comprises:
    a peak;
    a small planar surface extending from the peak to an end portion;
    a small curved surface portion continuous to and starting from the end portion of the planar surface extending toward the sheet base; wherein the curved surface is larger than the small planar surface; and
    wherein a top of the prism structure extending above the small curved surface portion comprises a near triangular prism such that the peak forms an apex of the near triangular prism.

2. The back-light unit according to claim 1, wherein the reflective surface element comprises at least a planar surface as the small curved surface portion and a second curved surface continuous therewith.

3. The back-light unit according to claim 1, wherein said small curved surface portion extends to a predetermined position from said top of said reflective surface along a direction toward said sheet base.

4. The back-light unit according to claim 1, wherein a top of a reflective surface constituting said prism sheet is disposed adjacently to said planar light guide.

5. The back-light unit according to claim 1, wherein the continuous prism structures are contiguous and connected through a connection plane extending from the sheet base to the sheet top of an adjacent prism structure.

6. The back-light unit according to claim 5, wherein said connection plane transmits said light launched with an intensity distribution of a predetermined angle range to said reflective surface element.

7. A transmission type liquid crystal display device comprising
a back-light unit and
a liquid crystal panel,
said back-light unit comprising;
    a light source for providing light exposed to said liquid crystal panel,
    a planar light guide for changing a direction of propagation of said light to said liquid crystal display panel, and
    a prism sheet disposed adjacently to said planar light guide, wherein said prism sheet comprises:
    contiguous prism structures extending throughout a surface of the prism sheet, each prism structure comprising:
    a sheet base;
    a sheet top; and
    a reflective surface element for reflecting the light to the liquid crystal display panel, said reflective surface element extending from said sheet base to said sheet top; and
    wherein said reflective surface element comprises:
    a peak;
    a small planar surface extending from the peak to an end portion;
    a small curved surface portion continuous to and starting from the end portion of the small planar surface extending toward the sheet base; wherein the curved surface is larger than the small planar surface; and
    wherein a top of the prism structure extending above the small curved surface portion comprises a near triangular prism such that the peak forms an apex of the near triangular prism.

8. The transmission type liquid crystal display device according to claim 7, wherein the reflective surface element comprises a planar surface as a said small curvature surface portion and a curved surface continuous thereto.

9. The transmission type liquid crystal display device according to claim 7, wherein said small curvature surface portion extends to a predetermined position from said top of said reflective surface along a direction toward said sheet base.

10. The transmission type liquid crystal display device according to claim 7, wherein a lens element is further disposed between said back-light unit and said liquid crystal panel.

11. The transmission type liquid crystal display device according to claim 7, wherein the continuous prism structures are contiguous and connected through a connection plane extending from the sheet base to the sheet top of an adjacent prism structure.

12. The transmission type liquid crystal display device according to claim 11, wherein said connection plane transmits said light launched with an intensity distribution of a predetermined angle range to said reflective surface element, and a top of a reflective surface constituting said prism sheet is disposed adjacently to said planar light guide.

* * * * *